United States Patent [19]
Abe et al.

[11] Patent Number: 5,428,091
[45] Date of Patent: *Jun. 27, 1995

[54] THERMOPLASTIC RESIN COMPOSITIONS COMPRISING POLYPHENYLENE ETHER, POLYOLEFINS AND DINITRODIAMINES

[75] Inventors: Hiroomi Abe; Takeshi Fujii; Masashi Yamamoto, all of Chiba; Shinichi Yachigo; Hideo Nagasaki, both of Osaka; Naoki Inui, Nara, all of Japan

[73] Assignee: Sumitomo Chemical Co., Ltd., Osaka, Japan

[ * ] Notice: The portion of the term of this patent subsequent to Apr. 5, 2011, has been disclaimed.

[21] Appl. No.: 171,622

[22] Filed: Dec. 22, 1993

Related U.S. Application Data

[62] Division of Ser. No. 667,408, Apr. 8, 1991, Pat. No. 5,300,568.

[51] Int. Cl.⁶ .................. C08K 5/32; C08L 71/12; C08L 23/00; C08L 53/00
[52] U.S. Cl. ..................... 524/260; 525/68; 525/92 B; 525/132; 525/133; 525/905
[58] Field of Search ............ 525/68, 92, 132, 133, 525/905; 524/260

[56] References Cited

U.S. PATENT DOCUMENTS

| | | | |
|---|---|---|---|
| 3,756,969 | 9/1973 | Danielson et al. | 524/236 |
| 4,554,264 | 7/1984 | Shiga et al. | 502/112 |
| 4,645,808 | 4/1985 | Shiga et al. | 526/119 |
| 4,672,050 | 3/1986 | Sasaki et al. | 502/116 |
| 4,743,665 | 1/1987 | Sasaki et al. | 526/119 |
| 4,761,392 | 11/1986 | Shiga et al. | 502/126 |
| 4,820,775 | 5/1986 | Shiga et al. | 525/247 |
| 4,900,706 | 3/1988 | Sasaki et al. | 502/116 |
| 4,914,153 | 4/1990 | Togo et al. | 525/68 |
| 4,972,021 | 11/1990 | Lee et al. | 525/132 |
| 5,017,663 | 5/1991 | Mizuno et al. | 525/397 |
| 5,019,615 | 5/1991 | Mizuno et al. | 524/100 |
| 5,051,484 | 12/1989 | Sasaki et al. | 526/151 |
| 5,106,913 | 4/1992 | Yamaguchi et al. | 525/377 |
| 5,300,568 | 4/1994 | Abe et al. | 525/68 |

FOREIGN PATENT DOCUMENTS

| | | |
|---|---|---|
| 253365 | 1/1988 | European Pat. Off. . |
| 268486 | 5/1988 | European Pat. Off. . |
| 329423 | 8/1989 | European Pat. Off. . |
| 61-53355 | 3/1986 | Japan . |
| 2160847 | 6/1990 | Japan . |

OTHER PUBLICATIONS

Carbon-13 Observations of the Stereochemical Configuration of Polypropylene, Communications to the Editor, Nov.-Dec. 1973, vol. 6, No. 6, pp. 925–926.
Model Compounds and ¹³C NMR Observation of Stereosequences of Polypropylene, Communications to the Editor, Sep.-Oct. 1975, vol. 8, No. 5, pp. 687–690.
Patent Abstracts of Japan, C Field, 1,4,5, vol. 10 No. 136, May 20, 1986.

*Primary Examiner*—Thomas Hamilton, III
*Attorney, Agent, or Firm*—Cushman Darby & Cushman

[57] ABSTRACT

A thermoplastic resin composition which comprises 100 parts by weight of a composition comprising 95–5 % by weight of at least one polyolefinresin (A) selected from homopolymers of ethylene or α-olefin or copolymers thereof and these homopolymers or copolymers modified with a polyfunctional compound (E) and/or an unsaturated monomer (L) and 5–95 % by weight of at least one polyphenylene-ether-resin (B) selected from polyphenylene ether, modified polyphenylene ether with the above (E) and/or (L) and a composition comprising the polyphenylene or modified polyphenylene ether and an aromatic vinyl polymer resin (M) and 0.001–10 parts by weight of a dinitrodiamine (D) of the following formula (I).

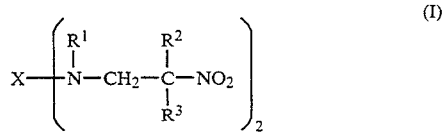

(I)

(wherein X represents a divalent chain aliphatic group, a cyclic aliphatic group or an aromatic group which may contain a halogen or an oxygen atom, R¹ represents a hydrogen atom, a chain aliphatic group, a cyclic aliphatic group or an aromatic group and when both of X and R¹ are chain aliphatic groups, the nitrogen atoms may further bond each other to form a ring through X and R¹; R² and R³ are independently a hydrogen atom or an alkyl group of 1–12 carbon atoms and R² and R³ may bond to form a ring).

4 Claims, 1 Drawing Sheet

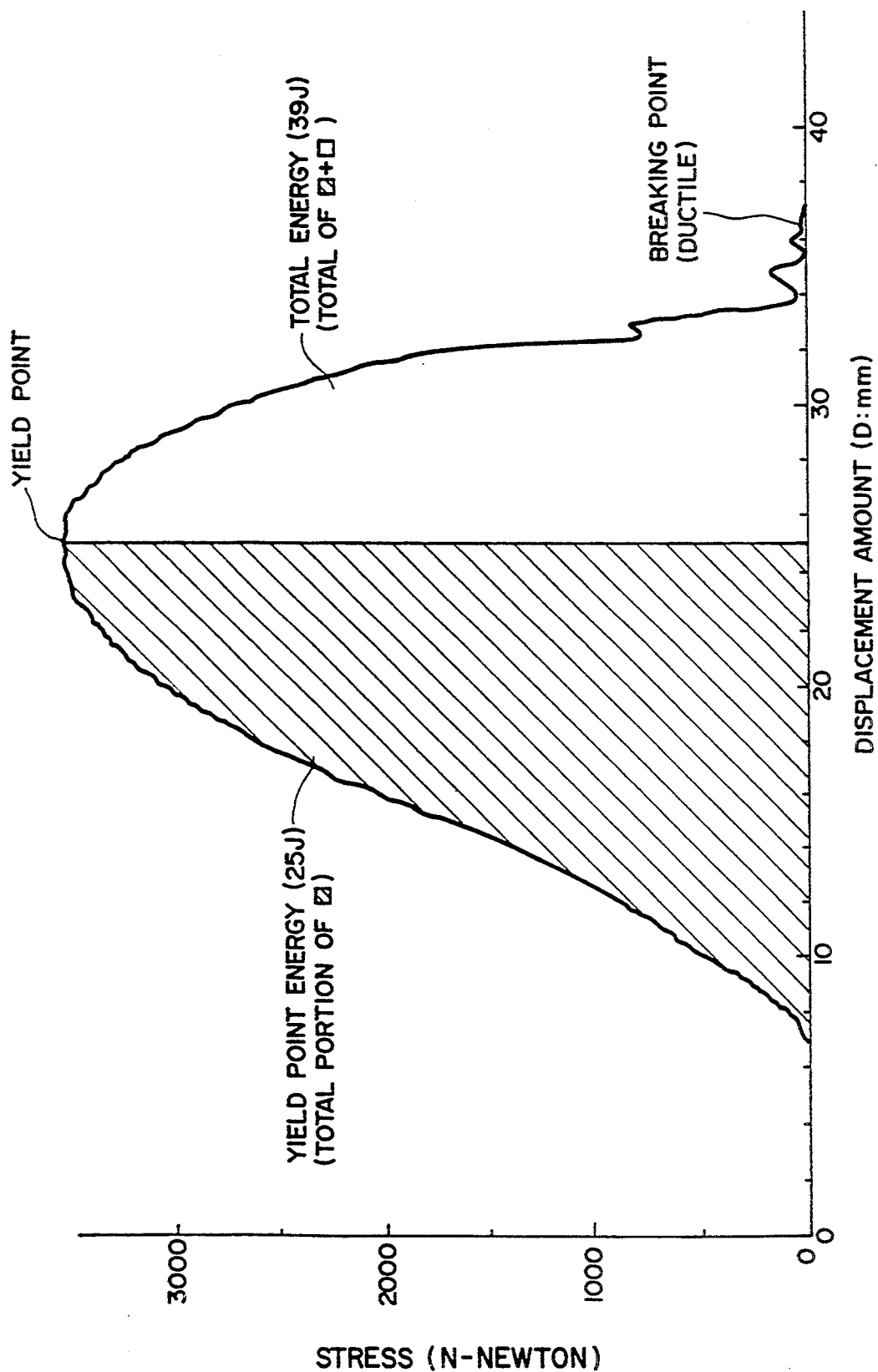

THERMOPLASTIC RESIN COMPOSITIONS COMPRISING POLYPHENYLENE ETHER, POLYOLEFINS AND DINITRODIAMINES

This is a divisional of application 07/667,408 which was filed on Apr. 8, 1991, now U.S. Pat. No. 5,300,568, which is the PCT U.S. national phase application of PCT JP90/00759, filed Jun. 11, 1990.

TECHNICAL FIELD

The present invention relates to a resin composition which can be utilized as shaped article, sheet, etc. by injection molding, extrusion molding, blow molding, etc.

More particularly, it relates to a resin composition which comprises a polyolefin and a polyphenylene ether and which is excellent in balance of mechanical strengths and chemical resistance.

BACKGROUND ART

Since polyolefin is excellent in processability, toughness, water resistance, organic solvent resistance and chemical resistance and is low in specific gravity and inexpensive, it has been widely utilized as various molded articles, films and sheets for a long time.

However, polyolefin is generally not so high in heat resistance and stiffness and is required to be further improved in these properties for new uses.

On the other hand, polyphenylene ether has excellent heat resistance and stiffness, but: has difficulties in processability and solvent resistance and thus is limited in scope of utilization thereof. In order to improve the processability and impact strength, blend with a styrene resin is utilized, but is inferior in solvent resistance and is limited in scope of use. For example, it is not suitable in the fields which require resistance to oily solvent such as gasolin containers.

Various blend composition have been proposed for utilizing merits of polyolefin and polyphenylene ether and supplementing their defects and theere is a composition for improvement of processability and tensile strength (Japanese Patent Kokoku No. 42-7069), but this composition does not necessarily satisfy relatively high level of mechanical strength required in industrial fields. Furthermore, in order to improve compatibility of polyolefin and polyphenylene ether to increase mechanical strength, there were proposed compositions which contain a block copolymer of styrene and butadiene or hydrogenation product thereof (Japanese Patent Kokai Nos. 53-71158, 54-88950 and 59-100159) and Compositions which additionally contain inorganic filler (Japanese Patent Kokai No. 58-103556). According to these proposals, processability and mechanical strength can be improved, but organic solvent resistance possessed by polyolefin is not sufficiently exhibited because addition amount of polyolefin is small or matrix (continuous phase) comprises polyphenylene ether or combination of polyphenylene ether with styrene resin. Furthermore, a composition which comprises polyphenylene ether to which is added polyolefin in a large amount of more than 20% by weight and is further added a diblock copolymer or radial teleblock copolymer comprising alkenyl aromatic compound having compatibilizing action and conjugated diene or hydrogenation product of these copolymers is disclosed in Japanese Patent Kokai NOs. 58-1.03557 and 60-76547. Moreover, there are disclosed. a technique of grafting styrene compound on polyolefin and then adding thereto polyphenylene ether in Japanese Patent Kokoku No. 56-22544 and a technique of blending polyolefin copolymerized with glycidyl methacrylate or the like with polyphenylene ether in Japanese Patent Kokai Nos. 57-108153 and 58- 225150. In addition, there are disclosed a technique of blending polyphenylene ether with both a polymer having glycidyl group and polyolefin having a group capable of reacting with glycidyl group in Japanese Patent Kokai No. 60-260449, a technique of blending polyphenylene ether with a modified copolymer obtained by polymerizing styrene compound with copolymer of glycidyl (meth)acrylate and olefin in Japanese Patent Kokai No. 61-47745, and a technique of blending modified polyphenylene ether and modified polyolefin with a binder having a specific structure in Japanese Patent Kokai No. 63-128056.

However, according to these conventional techniques, compatibility between polyphenylene ether and polyolefin is not necessarily satisfactory and as a result improvement of solvent resistance and mechanical strength is not sufficient and practically satisfactory materials have not yet been obtained.

DISCLOSURE OF INVENTION

Under the above circumstances, the present invention aims at developing novel additives, thereby to obtain a resin composition which contains a polyolefin-resin and a polyphenylene-ether-resin and which possesses simultaneously sufficient solvent resistance, high balance of mechanical strength and high processability.

As a result of research conducted by the inventors on various polyolefins, polyphenylene ethers and various additive components in order to offset and improve unsatisfactory points of mechanical properties on conventional polyolefin-polyphenylene ether blends, it has been found that a resin composition improved in compatibility between polyolefin and polyphenylene ether and excellent in balance of mechanical properties including mainly impact strength and in solvent resistance. Thus, the present invention has been accomplished.

That is, the present invention relates to:

(1) A thermoplastic resin composition, characterized by comprising 95–5% by weight of a polyolefin-resin (A), 5–95% by weight of a poly-phenylene-ether-resin (B), and 0.001–10 parts by weight of a dinitrodiamine (D) per 100 parts by weight of (A)+(B), wherein (A), (B) and (D) are as shown below:

(A): at least one selected from polyolefins selected from homopolymers of ethylene or α-olefin and copolymers comprising two or more of these monomers and modified polyolefins obtained[by modifying these polyolefins with modifiers in the presence or absence of radical initiators, said modifier is at least one selected from polyfunctional compounds (E) having in molecule at least one of a carboxylic acid group, an acid anhydride group, an acid amide group, an imide group, a carboxylic acid ester group, an epoxy group, an amino group and a hydroxyl group and unsaturated monomers (L) other than the polyfunctional compounds (E).

(B): at least one selected from polyphenylene ethers, modified polyphenylene ethers obtained by modifying polyphenylene ethers with the above modifier in the presence or absence of a radical initiator, compositions comprising a polyphenylene ether and at least one aromatic vinyl polymer resin (M) selected from aromatic vinyl polymers, copolymers of aromatic vinyl compound with other monomers and rubber-modified aromatic vinyl polymers and compositions comprising modified polyphenylene ether and at least one aromatic vinyl polymer resin (M).

(D): Dinitrodiamines represented by the formula (I):

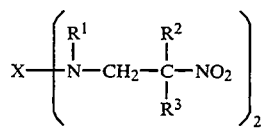

(wherein X represents a divalent chain aliphatic group, a cyclic aliphatic group or an aromatic group which may contain a halogen or an oxygen atom; $R^1$ represents a hydrogen atom, a chain aliphatic group, a cyclic aliphatic group or an aromatic group and when both of X and $R^1$ are chain aliphatic groups, nitrogen atoms may further bond each other to form a ring through X and $R^1$; and $R^2$ and $R^3$ are independently a hydrogen atom or an alkyl group of 1-12 carbon atoms and $R^2$ and $R^3$ may bond to form a ring).

(2) A thermoplastic resin composition, characterized by comprising 94-2% by weight of a polyolefin-resin (A), 2-94% by weight of a polyphenylene-ether-resin (B), 1-50% by weight of a rubber-like material (C), and 0.001-10 parts by weight of a dinitrodiamine (D) per 100 parts by weight of (A)+(B)+(C), wherein (C) is as shown below:

(C): at least one of natural or synthetic elastomeric polymers which are elastic at 20°-25° C and modified elastomeric polymers obtained by modifying these elastomeric polymers with modifier mentioned in (1) in the presence or absence of a radical initiator.

Further, the present invention will be specifically explained based on embodiments. That is, the present invention relates to:

(3) A thermoplastic resin composition mentioned in (1) which is prepared by adding 0.001-10 parts by weight of dinitrodiamine (D) to 100 parts by weight of a composition (R-1) comprising 95-5% by weight of polyolefin-resin (A) and 5-95% by weight of polyphenylene-ether-resin (B), (4) A thermoplastic resin composition mentioned in (2) which is prepared by adding 0.001-10 parts by weight of dinitrodiamine (D) to 100 parts by weight of a composition (R-2) comprising 94-2% by weight of the polyolefin-resin (A), 2-94% by weight of the polyphenylene-ether-resin (B) and 1-50% by weight of rubber-like material (C), (5) A thermoplastic resin composition mentioned in (1) or (2) which is prepared by further adding 1-1800 parts by weight of polyolefin and/or 1-100 parts by weight of elastomeric polymer to 100 parts by weight of the thermoplastic resin composition mentioned in (3), amount of saidpolyolefin being less than 95% by weight based on the total amount of this polyolefin and the polyolefin-resin (A) in composition (R-1), (6) A thermoplastic resin composition mentioned in (2) which is prepared by further adding 1-1800 parts by weight of polyolefin and/or 1-100 parts by weight of elastomeric polymer to 100 parts by weight of the thermoplastic resin composition mentioned in (4), amount of said polyolefin being less than 95% by weight based on the totell amount of this polyolefin and the polyolefin-resin (A) in the composition (R-2) and amount of said elastomeric polymer being less than 95% by weight based on the total amount of this elastomeric polymer and the rubber-like material (C) in the composition (R-2), (7) A thermoplastic resin composition mentioned in (1) which is prepared by adding 0.01-20 parts by weight of a polyfunctional compound (E) containing 0.01-20 parts by weight of an unsaturated monomer (L) or not, and 0.001-10 parts by weight of a radical initiator to 100 parts by weight of the composition (R-1) mentioned in (3) and melt kneading the mixture to obtain the composition (R-3) and adding 0.001-10 parts by weight of dinitrodiamine (D) to 100 parts by weight of the composition (R-3), (8) A thermoplastic resin composition mentioned in (2) which is prepared by adding 0.01-20 parts by weight of a polyfunctional compound (E) containing 0.01-20 parts by weight of an unsaturated monomer (L) or not, and 0.001-10 parts by weight of a radical initiator to 100 parts by weight of the composition (R-2) mentioned in (4), melt kneading the mixture to obtain a composition (R-4), and adding 0.001-10 parts by weight of dinitrodiamine (D) to 100 parts by weight of the composition (R-4), (9) A thermoplastic resin composition mentioned in (1) or (2) which is prepared by adding 0.01-20 parts by weight of a polyfunctional compound (E) containing 0.01-20 parts by weight of an unsaturated monomer (L) or not, and 0.001-10 parts by weight of a radical initiator to 100 parts by weight of the composition (R-1 ) mentioned in (3 ), melt kneading the mixture to obtain the composition (R-3), and adding 0.001-10 parts by weight of dinitrodiamine (D) and 1-1800 parts by weight of polyolefin and/or 1-100 parts by weight of elastomeric polymer, amount of said polyolefin being less than 95% by weight based on the total amount of this polyolefin and the polyolefin-resin (A) in the composition (R-1),

(10) A thermoplastic resin composition mentioned in (2) which is prepared by adding 0.001-20 parts by weight of a polyfunctional compound (E) containing 0.01-20 parts by weight of an unsaturated monomer (L) or not, and 0.001-10 parts by weight of a radical initiator to 100 parts by weight of the composition (R-2) mentioned in (4), melt kneading the mixture to obtain a composition (R-4), and adding 0.001-10 parts by weight of dinitrodiamine (D) and 1-1800 parts by weight of polyolefin and/or 1-100 parts by weight of elastomeric polymer to 100 parts by weight of said composition (R-4), amount of said polyolefin being less than 95% by weight based on the total amount of this polyolefin and the polyolefin-resin (A) in the composition (R-2) and amount of said elastomeric polymer being less than 95% by weight based on the total amount of this elastomeric polymer and, the rubber-like material (C) in the composition (R-2), and

(11) A thermoplastic resin composition mentioned in (1) or (2), wherein the polyolefin is at least one crystalline polypropylene selected from crystalline propylene homopolymers, crystalline propylene/α-olefin random copolymers prepared by copolymerizing propylene with 6 mol % or less of ethylene and/or at least one other α-olefin, and crystalline propylene/α-olefin block copolymer having propylene homopolymer portion or propylene/α-olefin random copolymer portion containing 6 mol % or less of ethylene and/or at least one other α-olefin, as the first segment, and propylene/α-olefin random copolymer portion containing 10 mol % or more of ethylene and/or at least one other α-olefin, as the second segment.

The polyolefin-resin (A) is at least one selected from polyolefins selected from homopolymers of ethylene or α-olefin and copolymers of two or more of these monomers and modified polyolefins obtained by modifying these polyolefins with a modifier in the presence or absence of radical initiator.

Polyolefins are crystalline olefin polymers and, as examples thereof, mention may be made of polymers of olefins per se such as polypropylene, high-density polyethylene, low-density polyethylene, linear low-density polyethylene, propylene-ethylene copolymer, ethylene-butene-1 copolymer, ethylenepentene copolymer, ethylene-hexene copolymer, and poly-4-methylpentene-1; and copolymers of a major amount of olefin and vinyl monomer copolymerizable therewith (for example, acrylic esters, methacrylic esters, vinyl acetate, styrene, acrylonitrile, and glycidyl (meth)acrylate). Copolymerization may be any of random copolymerization, block copolymerization, and graft copolymerization. These may be used singly or as a mixture of two or more. Among these polyolefins, polyethylene and polypropylene are preferred and polypropylene and random copolymers and block copolymers of propylene-ethylene are especially preferred.

These polyolefins can be prepared by processes known to one skilled in the art, for example, one mentioned in "ENCYCLOPEDIA OF POLYMER SCIENCE AND TECHNOLOGY", vol. 6, page 275 (1967) and vol. 11, page 597 (1969) published from John Wiley & Sons, inc.

Polypropylene in the present invention is crystalline polypropylene and includes, in addition to the crystalline propylene homopolymer, crystalline propylene/α-olefin block copolymers obtained by polymerizing propylene or copolymerizing propylene and 6 mol % or less of ethylene and/or at least one other α-olefin such as butene-1 at the first step and copolymerizing propylene and 10 mol % or less of ethylene and/or at least one other α-olefin such as butene-1 at the second step, and crystalline propylene/α-olefin random copolymers obtained by copolymerizing propylene with 6 mol % or less of ethylene and/or at least one other α-olefin such as butene-1 and hexene-1.

Crystalline polypropylene can be obtained by carrying out reaction in the presence of a catalyst comprising a combination of titanium trichloride and an alkylaluminum compound which is usually called Ziegler-Natta catalyst.

Polymerization can be carried out at 0° C.–300° C. However, in the case of highly stereoregular polymerization of α-olefins such as propylene, the polymerization is suitably carried out at 0° C.–100° C. because highly stereoregular polymer cannot be obtained at a temperature higher than 100° C.

Polymerization pressure has no special limitation, but a pressure of about 3–100 atm is desired from industrial and economical viewpoints.

Polymerization method may be either continuous type or batch type.

Polymerization method may be slurry polymerization using inert hydrocarbon solvents such as butane, pentane, hexane, heptane and octane, solvent polymerization according to which polymerization is carried out at the state where produced polymer is dissolved in the inert hydrocarbon solvents, bulk polymerization in liquefied monomer with no solvents, and gas phase polymerization in gaseous monomer.

It is also possible to add a chain transfer agent such as hydrogen-for modification of molecular weight of polymer.

Crystalline polypropylene used in the present invention can be prepared by using isospecific Ziegler-Natta catalyst. Catalyst used is preferably high in isospecificity.

Catalysts which can be suitably used are those which comprise titanium trichloride having layer crystal structure or a composite solid compound of a magnesium compound and a titanium compound as a transition metal catalyst component and an organo-aluminum compound as typical metal component. The catalysts can contain known electron donating compound as a third component.

As titanium trichloride, there may be used one which is prepared by reducing titanium tetrachloride with various reducing agents. Metals such as aluminum and titanium, hydrogen, organometallic compounds are known as the reducing agents. Typical example of titanium trichloride prepared by reduction with metal is a titanium trichloride composition ($TiCl_3AA$) containing chloride of aluminum obtained by reducing titanium tetrachloride with metallic aluminum and then activated by grinding in ball mills, vibration mills, and the like. In order to improve isospecificity, polymerization activity and/or particle properties, a compound selected from ether, ketone, ester, aluminum chloride, titanium tetrachloride and the like may be allowed to coexist at the time of grinding.

Titanium trichloride more preferred for the object of the present invention is one which is obtained by reducing titanium tetrachloride with an organoaluminum compound and subjecting the resulting titanium trichloride composition to catalytic reaction with an ether compound and a halogen compound simultaneously or successively. The ether compound is preferably one which has the formula $R^1$-O-$R^2$ ($R^1$, $R^2$ are alkyl groups of 1–18 carbon atoms), and especially preferred are di-n-butyl ether and di-t-amyl ether. Halogen is especially preferably iodine, halogen compound is especially preferably iodine trichloride, titanium halide is especially preferably titanium tetrachloride, and halogenated hydrocarbons are especially preferably carbon tetrachloride and 1,2-dichloroethane. Organoaluminum compounds are preferably those which are represented by the formula $AlR^3 X_{3-n}$ ($R^3$ is a hydrocarbon group of 1–18 carbon atoms, X is a halogen selected from Cl, Br, and I and n is a numeral satisfying $3 \geq n > 1$) and especially preferably diethylaluminum chloride and ethylaluminum sesquichloride.

Processes for preparing these titanium trichlorides are mentioned in detail in Japanese Patent Kokai Nos. 47-34470, 53-33289, 53-51285, 54-11986, 58-142903, 60-28405, 60-228504, and 61-218606.

When titanium trichloride having a layer crystal structure is used as a transition metal compound component, an organoaluminum compound represented by the formula $AlR^4_m X_{3-31\ m}$ ($R^4$ is a hydrocarbon group of 1–18 carbon atoms, X is a halogen selected from Cl, Br and I, and m is $3 \geq m > 0$) is preferred as a typical metal compound component. Organoaluminum compounds especially preferred for attaining the object of the present invention are those which have an ethyl or isobutyl group as $R^4$ with m being $2.5 \geq m > 1.5$. Examples are diethylaluminum chloride, diethylaluminum bromide, diethylaluminum iodide and mixtures thereof with triethylaluminum or ethylaluminum dichloride. When a third component mentioned hereinafter is used in combination, organoaluminum compounds of $3 \geq m > 2.5$ or $1.5 \geq m > 0$ can also be suitably used for attaining the object of the present invention.

Ratio of organoaluminum compounds and titanium trichloride can be selected from the wide molar ratio range of 1:1–1000:1.

Catalyst comprising titanium trichloride and organoaluminum compound can contain known the third component. As the third component, mention may be made of, for example, ester compounds such as ε-caprolactam, methyl methacrylate, ethyl benzoate, and methyl toluylate, phosphite esters such as triphenyl phosphite and tributyl phosphite, and phosphoric acid derivatives such as hexamethyl-phosphorictriamide.

Amount of the third component used must be determined experimentally for every compound because respective compounds differ in action, but in general the amount is at most equimolar to the organoaluminum compound.

When composite solid compounds of magnesium compounds and titanium compounds are used as a transition metal solid catalyst component, organoaluminum compounds, especially those which are represented by the formula $AlR^5_pX_{3-p}$ ($R^5$ is a hydrocarbon group of 1–18 carbon atoms, X is a halogen selected from Cl, Br and I and p is $3 \geq p > 2$) are preferred. Examples of them are triethylaluminum, triisobutylaluminum, and mixtures thereof with diethylaluminum chloride or diisobutylaluminum chloride.

The catalyst preferably contains an electron donating compound, especially an aromatic monocarboxylate ester and/or silicone compound having Si-OR$^6$ bond.

As silicone compounds having Si-OR$^6$ bond (R$^6$ is a hydrocarbon group of 1–20 carbon atoms), suitable are alkoxysilane compounds represented by the formula $R^7_aSi(OR^6)_{4-a}$ (R$^6$ and R$^7$ each represents a hydrocarbon group of 1–20 carbon atoms and a is $0 \leq a \leq 3$). As examples thereof, mention may be made of tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane and diethyldiethoxysilane.

The electron donating compound is preferably used in an amount within the range of 1 mol or less, especially 0.05–1 mol per 1 mol of the organoaluminum compound.

As composite solid compounds of magnesium compounds and titanium compounds, there may be used titanium trichloride containing chloride of magnesium which is obtained by reducing titanium tetrachloride with an organomagnesium compound or so-called "supported catalyst" prepared by catalytic reaction of a solid magnesium compound with a liquid phase titanium compound. The solid magnesium compound preferably contains electron donating compounds, especially aromatic monocarboxylate esters, aromatic dicarboxylate diesters, ether compounds, alcohols and/or phenols. The aromatic monocarboxylate ester may be allowed to coexist at the time of catalytic reaction with titanium compounds.

The above composite solid compounds of magnesium compounds and titanium compounds are disclosed in many patent publications and catalysts suitable for attaining the objects of the present invention are mentioned in detail in Japanese Patent Kokai Nos. 54-112988, 54-119586, 56-30407, 57-59909, 57-59910, 57-59911, 57-59912, 57-59914, 57-59915, 57-59916, 54-112982, 55-133408 and 58-27704.

When the thermoplastic resin composition of the present invention is employed for uses which require heat resistance, stiffness and scratchability, it is preferred to use, as crystalline polypropylene, a highly crystalline polypropylene wherein isotactic pentad ratio in a boiling heptane-insoluble fraction of the crystalline propylene homopolymer or of the propylene homopolymer portion which is the first segment polymerized in the first step for the crystalline propylene/α-olefin block copolymer is 0.970 or more and a content of a boiling heptane-soluble fraction is 5.0% by weight or less and a content of a 20° C. xylene-soluble fraction is 2.0% by weight or less.

The isotactic pentad ratio in the boiling heptane-insoluble fraction, the content of boiling heptane-soluble fraction and the content of polymer soluble in xylene of 20° C. mentioned above are determined in the following manner.

Five g of crystalline polypropylene is completely dissolved in 500 ml of xylene and then the solution is cooled to 20° C. and is left to stand for 4 hours. Thereafter, this is filtered to remove the: 20° C. xylene-insoluble fraction. The filtrate is concentrated to dryness to evaporate xylene and further dried at 60° C. under reduced pressure to obtain the polymer soluble in xylene of 20° C. Dry weight of this polymer is divided by weight of a charged sample and the resulting value expressed by percentage is the content of 20° C. xylene-soluble fraction. The 20° C. xylene-insoluble fraction is dried and then is subjected to Soxhlet extraction with boiling n-heptane for 8 hours. The extraction residue is called the boiling heptane-insoluble fraction. Value obtained by subtracting dry weight of this boiling heptane-insoluble fraction from weight of the charged sample (5 g) is divided by weight of the charged sample. The thus obtained value expressed by percentage is the content of boiling heptane-soluble fraction.

Isotactic pentad ratio is an isotactic chain as pentad unit in crystalline polypropylene molecular chain, in other words, proportion of propylene monomer unit present at the center of chain formed by successive five propylene monomer units having four meso-linkages which is measured by the method disclosed by A. Zambelli et al in "Macromolecules", 6,925 (1973), namely, by using $^{13}$C-NMR. Assignment of NMR absorption. peak is carried out based on the subsequently published "Macromolecules", 8, 687 (1975).

Specifically, isotactic pentad ratio is measured as an area proportion of mmmm peak in all absorption peaks of a methyl carbon region of $^{13}$C-NMR spectrum. Isotactic pentad ratio of a NPL standard substance CRM No. M19-14 Polypropylene PP/MWD/2 manufactured by National Physical Laboratory, England, is 0.944 according to the above method.

The highly crystalline polypropylene can be prepared by the processes exemplified in Japanese Patent Kokai Nos. 60-28405, 60-228504, 61-218606 and 61-287917.

When the thermoplastic resin composition of the present invention is employed for uses which require impact resistance, the crystalline polypropylene is preferably a crystalline propylene/α-olefin block copolymer which comprises a propylene homopolymer portion or a propylene/α-olefin random copolymer portion which is the first segment polymerized in the first step and a propylene/α-olefin random copolymer portion which is the second segment polymerized in the second step.

The block copolymer can be produced by slurry polymerization process and gas phase polymerization process. When it is used for use which requires especially high impact resistance, it is necessary to increase amount of the second segment and such block copolymer can be produced suitably by gas phase polymerization process.

The high-impact polypropylene according to gas phase polymerization process can be produced, for example, by the process disclosed in Japanese Patent Kokai No. 61-287917.

The first segment of the block copolymer preferably has a propylene homopolymer portion or a propylene/α-olefin random copolymer portion containing at most 6 mol % of ethylene and/or at least one other α-olefin.

The second segment preferably has an ethylene homopolymer portion, or a propylene/α-olefin random copolymer portion containing at least 10 mol % of ethylene or at least one other α-olefin, or a random copolymer portion of ethylene and propylene having ethylene content of at least 10 mol %, or a random copolymer portion of propylene and ethylene with or without α-olefins of 4-6 carbon atoms which has an ethylene content of at least 10 mol %. The second segment is in an amount of 10-70% by weight based on total polymerization amount.

In case of slurry polymerization process, the block copolymer is properly produced with the second segment amount being within the range of 10-30% by weight and in case of gas phase polymerization process, it is properly produced with the second segment amount being within the range of 10-70% by weight.

In case of gas phase polymerization process, propylene block copolymer of the larger second segment amount can be produced by the process mentioned in Japanese Patent Application No. 62-256015 and this can be suitably applied to the use which requires superhigh impact resistance.

Intrinsic viscosity of the second. segment in tetralin solvent at 135° C. must be changed depending on productivity at preparation, powder properties of polymer and intrinsic viscosity of the first segment, but is normally 3-8 dl/g in case of slurry polymerization process and 1-5 dl/g in case of gas phase polymerization process.

The modified polyolefin used in the present invention is a polyolefin which is modified with at least one modifier selected from polyfunctional compounds (E) having, in molecule, at least one of a carboxylic acid group, an acid anhydride group, an acid amide group, an imide group, a carboxylic acid ester group, an epoxy group, an amino group and a hydroxyl group and unsaturated monomers (L) other than the polyfunctional compounds (E) in the presence or absence of a radical initiator. These modifiers and amount thereof will be explained specifically in the part of explanation about process for production of modified polyphenylene ether.

As process for production of modified polyolefin, known processes can be employed and specifically, the processes mentioned in the part about process for production of modified polyphenylene ether are used.

In the present invention, as one preferred embodiment of modified polypropylene among modified polyolefins, it can be obtained by graft copolymerizing polypropylene with an unsaturated carboxylic acid or a derivative thereof as a modifier (hereinafter referred to as "graft monomer"), preferably together with an aromatic vinyl monomer and, if necessary, in the presence of a radical initiator. A process for production of the modified polypropylene will be specifically explained.

A modified polypropylene which is large in grafting amount of unsaturated carboxylic acid or derivative thereof, is less in change of flowability (melt flow rate) before and after graft modification and is excellent in properties can be obtained by graft modification in the presence of aromatic vinyl monomers.

For grafting the graftable monomer on polypropylene, various known processes carl be employed.

That is, there are a process which comprises mixing polypropylene, a graftable monomer and a radical initiator and melt kneading the mixture in a melt kneading apparatus to perform grafting, a process which comprises dissolving polypropylene in an organic solvent such as xylene, then carrying out a reaction by heating with addition of radical initiators under stirring in nitrogen atmosphere, cooling the reaction mixture after completion of the reaction, washing and flitrating it, followed by drying to obtain grafted polypropylene, a process which comprises irradiating polypropylene with ultraviolet ray or radiation in the presence of graftable monomer and a process which comprises contacting polypropylene with oxygen or ozone.

Most preferred is the process which comprises graft copolymerizing by melt kneading in a melt kneading apparatus from economical viewpoint.

Polypropylene, an unsaturated carboxylic acid or derivative thereof and an unsaturated aromatic monomer and, if necessary, a radical initiator can be melt kneaded at a temperature of 150°-300° C., preferably 190°-280° C. and for a residence time of 0.3-10 minutes, preferably 0.5-5 minutes using an extruder, Banbury mixer, kneader or the like. Industrially advantageous process is one which is carried out continuously by single-screw or twin-screw extruders with keeping vent holes at vacuum state and with removing unaltered components (unsaturated carboxylic acids or derivative thereof, unsaturated aromatic monomers, radical initiators) and side-reaction products such as oligomer and decomposition products. Reaction atmosphere may be air, but preferably inert gas such as nitrogen or carbon dioxide. The resulting modified polypropylene may be further subjected to a heat treatment at higher than 60° C., solvent extraction and drawing a vacuum in melting for further removing slight amounts of unaltered components and side-reaction products contained in the modified polypropylene.

Furthermore, if necessary, various additives such as antioxidant, heat stabilizer, light stabilizer, nucleating agent, lubricant, antistatic agent, inorganic or organic colorant, rust preventive, crosslinking agent, foaming agent, plasticizer, fluorescent agent, surface smoothing agent, and surface gloss improver can be added to the modified polypropylene during production step or subsequent processing steps.

As the unsaturated carboxylic acids or derivatives thereof used for modification of polypropylene, mention may be made of, for example, unsaturated carboxylic acids such as acrylic acid, methacrylic acid, maleic acid, itaconic acid, citraconic acid, himic acid, bicyclo(2,2,2)octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo (2,2,1) octa-7-ene-2,3,5,6-tetracarboxylic acid, and 7-oxabicyclo (2,2,1)hepta-5-ene-2,3-dicarboxylic acid. As derivatives of unsaturated carboxylic acids, there are acid ahydrides, esters, amides, imides and metal salts such as, for example, maleic anhydride, itaconic anhydride, citraconic anhydride, himic anhydride, monoethyl maleate, monomethyl fumarate, monomethyl itaconate, dimethyl fumarate, dimethylaminoethyl methacrylate, dimethylaminopropylacrylamide, acrylamide, methacrylamide, maleic acid monoamide, maleic acid diamide, maleic acid-N-monoethylamide, maleic acid-N, N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate, and potassium methacrylate.

Among them, use of maleic anhydride is most preferred.

As the aromatic vinyl monomers used for the modified polypropylene, styrene is most preferred, but o-methylstyrene, p-methylstyrene, m-methylstyrene, α-methylstyrene, vinyltoluene, and divinylbenzene may also be used and these may also be used in admixture.

Production of the modified polypropylene can also be carried out in the absence of a radical initiator, but is usually preferably carried out in the presence of a radical initiator. As a radical initiator, there may be used known ones and as examples, mention may be made of azo compounds such as 2,2'-azobisisobutyronitrile and 2,2'-azobis(2,4,4)-trimethylvaleronitrile, and various organic peroxides such as methyl ethyl kenone peroxide, cyclohexanone peroxide, 3,3,5- trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,5,5-trimethylhexanoyl peroxide, benzoyl peroxide, t-butyl peracetate, t-butylperoxyisobutyrate, t-butyloxypivarate, t-butyl-oxy-2-ethylhexanoate, t-butylperoxy-3,5,5-trimethylhexanoate, t,-butylperoxylaurate, t-butylperoxybenzoate, di-t-butylperoxyisophthalate, 2,5-dimethyl-2,5-di(benzoylperoxy)hexane, t-butylperoxymaleic acid, t-butylperoxyisopropyl carbonate, and polystyrene peroxide.

Melt flow rate of starting polypropylenes (crystalline propylene homopolymer, crystalline propylene/α-olefin block copolymer crystalline propylene/α-olefin random copolymer) in production of modified polypropylene is 0.05–60 g/10 min, preferably 0.1–40 g/10 min, but desirably is selected so that melt flow rate of the resulting modified polypropylene is 0.1–100 g/10 rain, preferably 0.5–50 g/10 min. Further, number-average molecular weight of starting polypropylene is 7,000-800,000, preferably 10,000–700,000.

Amounts of respective components in production of modified polypropylene are as follows: amount of unsaturated carboxylic acid or derivative thereof is preferably 0.01–10 parts by weight, more preferably 0.1–5 parts by weight, that of aromatic vinyl monomer is preferably 0.01–10 parts by weight, more preferably 0.1–5 parts-by weight and that of radical initiator is preferably 0–5 parts by weight, more preferably 0.001–2 parts by weight per 1.00 parts by weight of polypropylene. When addition amount of unsaturated carboxylic acid or derivative thereof is less than 0.01 part by weight, modification effect is not so high and when it is more than 10 parts by weight, modification effect reaches saturation and not only no further conspicuous effect is exhibited, but also it remains much in the polymer as unaltered materials, which have offensive smell and causes reduction of properties and such is practically not preferred. When addition amount of aromatic vinyl monomer is less than 0.01 part by weight, modification effect is not so high and when it is more than 10 parts by weight, no further conspicuous effect can be obtained. Further, addition amount of a radical initiator of more than 5% by weight is not practically preferred because no further conspicuous effect is exhibited on graft reaction of unsaturated carboxylic acid or derivative thereof and polypropylene decomposes much and change in flowability (melt flow rate) is great.

The aromatic vinyl-graft polypropylenes are polypropylenes obtained by graft copolymerizing polypropylene with aromatic vinyl monomers represented by the formula:

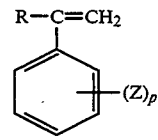

[wherein R represents a hydrogen atom, a lower alkyl group (such as an alkyl group of 1–4 carbon atoms) or a halogen atom, Z represents a hydrogen atom, a vinyl group, a halogen, an amino group, a hydroxyl group or a lower alkyl group, and p represents 0 or an integer of 1–5].

As examples of aromatic vinyl monomers, mention may be made of styrene, 2,4-dichlorostyrene, p-methoxystyrene, p-methylstyrene, p-phenylstyrene, p-divinylstyrene, p-(chloromethoxy)-styrene, α-amethylstyrene, o-methyl-α-methylstyrene, m-methyl-α-methylstyrene, p-methyl-α-methylstyrene, and p-methoxy-α-methylstyrene. These may be used singly or in combination of two or more. Among them, styrene is most preferred.

Process for production of aromatic vinyl-graft polypropylene by graft copolymerization of aromatic vinyl monomer has no special limitation and, for example, there may be used any known methods such as suspension polymerization, emulsion polymerization, solution polymerization, bulk polymerization (including a method using extruders in addition to method using polymerization tanks). Specifically, there may be employed a method mentioned in the part of explanation of modified polyphenylene ether.

Specifically, mention may be made of a method which comprises first preparing a polymer of aromatic vinyl monomer by anion polymerization and then melt kneading this polymer and polypropylene together with peroxide as shown below to obtain an aromatic vinyl-graft polypropylene and a method which comprises copolymerizing polypropylene with aromatic vinyl monomer by radical polymerization.

Peroxides used in production of the above aromatic vinyl graft polypropylene have no special limitation and desired ones can be optionally chosen and used. Various peroxides mentioned in the part on explanation of modified polyphenylene ether can be referred to.

Aromatic vinyl monomer is graft copolymerized in an amount of 0.2–150 parts by weight, preferably 2–90 parts by weight, more preferably 3–70 parts by weight per 100 parts by weight of polypropylene.

In the present invention, polyphenylene-ether-resin (B) includes at least one selected from polyphenylene ether, modified polyphenylene ether obtained by modifying polyphenylene ether with a modifier in the presence or absence of radical initiator, a composition comprising polyphenylene ether and at least one aromatic vinyl polymer resin (M) selected from aromatic vinyl polymer, copolymer of aromatic vinyl compound and other monomer, and rubber-modified aromatic vinyl polymer, and a composition comprising modified polyphenylene ether and aromatic vinyl polymer resin (M).

The modified polyphenylene ether in the present invention is one obtained by modifying polyphenylene ether with at least one selected from polyfunctional compound (E) and unsaturated monomer (L) other than said polyfunctional compound (E).

The polyphenylene ether is a polymer obtained by oxidation polymerization of a phenol compound represented by the formula (II):

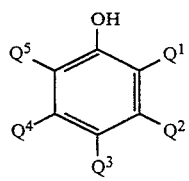
(II)

(wherein $Q^1$, $Q^2$, $Q^3$, $Q^4$ and $Q^5$ each represents a hydrogen atom, a halogen atom, a hydrocarbon group or a substituted hydrocarbon group and one of them is necessarily a hydrogen atom) with oxygen or a gas containing oxygen using an oxidation coupling catalyst.

Examples of $Q^1$, $Q^2$, $Q^3$, $Q^4$ and $Q^5$ in the above formula (II) are hydrogen, chlorine, fluorine, bromine, iodine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, and ethylphenyl.

Examples of the phenol compounds shown by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, and 2,3,5-, 2,3,6-, and 2,4,6-trimethylphenol. These phenol compounds may also be used in combination of two or more.

Further, the polyphenylene ether may be copolymers of the phenol compounds of the above formula and other phenol compounds, for example, dihydric phenols such as bisphenol A, tetrabromobisphenol A, resorcin, and hydroquinone. Among them, preferred are homopolymers and copolymers of 2,6-dimethylphenol and 2,3,6-trimethylphenol.

Especially preferred is poly(2,6-dimethyl-1,4-phenylene)ether.

Any oxidation coupling catalysts can be used for oxidation polymerization of the phenol compounds as far as they have polymerization ability. Typical example thereof are catalysts comprising cuprous salt and tert. amine such as cuprous chloride-trimethylamine, cuprous acetate-triethylamine and cuprous chloride-pyridine; catalysts comprising cupric salt/tert. amine and alkali metal hydroxide such as cupric chloride-pyridine-potassium hydroxide; catalysts comprising manganese salt and primary amine such as manganese chloride-ethanolamine and manganese acetate-ethylenediamine; catalysts comprising manganese salt and alcoholate or phenolate such as manganese chloride-sodium methylate and manganese chloride-sodium phenolate; catalysts comprising manganese salt, alkali hydroxide and amine such as manganese chloride-NaOH-diethanolaminedibutylamine, manganese chloride-NaOH-triethanolaminedibutylamine and manganese chloride-NaOH-monoethanol-amine-dibutylamine, and catalysts comprising cobalt salt and tert. amine.

Intrinsic viscosity (measured in chloroform at 30° C.) of polyphenylene ether used in the present invention has no special limitation, but preferably is 0.2–1.0 dl/g, more preferably 0.25–0.6 dl/g and optimum intrinsic viscosity can be selected depending on circumstances.

The modifier used for preparation of modified polyphenylene ether, modified polyolefin or modified elastomeric polymer is at least one selected from polyfunctional compound (E) having, in molecule, at least one of a carboxylic acid group, an acid anhydride group, an acid amide group, an imide group, a carboxylic acid ester group, an epoxy group, an amino group, or a hydroxyl group and unsaturated monomer (L) other than the polyfunctional compound (E). Preferred polyfunctional compound (E) is compound (F) having in molecule simultaneously (a) carbon-carbon double bond or carbon-carbon triple bond and (b) at least one of a carboxylic acid group, an acid anhydride group, an acid amide group, an imide group, a carboxylic acid ester group, an epoxy group, an amino group and a hydroxyl group.

Examples of the compound (F) are maleic anhydride, maleic acid, fumaric acid, maleimide, maleic acid hydrazide, reaction products of maleic anhydride and diamine, for example, compounds having the formulas:

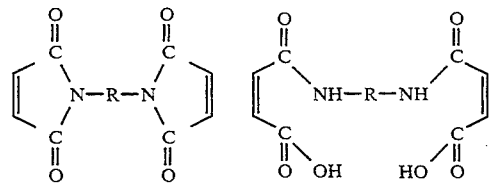

(wherein R is an aliphatic or aromatic group), methylnadic anhydride, dichloromaleic anhydride, maleic acid amide, natural fats and oils such as soybean oil, tung oil, caster oil, linseed oil, hempseed oil, cottonseed oil, sesame oil, rapeseed oil, peanut oil, camellia oil, olive oil, coconut oil, and sardine oil; epoxidized natural fats and oils such as epoxided soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2 hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9 -hexadecenoic acid, 2-octadecenoic acid, 9-octadecenoic acid, eicosenoic acid, docosenoic acid, erucic acid, tetracocenoic acid, mycolipenic acid, 2,4-pentadienoic acid, 2,4 -hexadienoic acid, diallylacetic acid, geranic acid, 2,4 -decadienoic acid, 2,4 -dodecadienoic acid, 9,12-hexadecadienoic acid, 9,12-octadecadienoic acid, hexadecatrienoic acid, linolic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid, and triacontenoic acid; and esters, acid ,amides and anhydrides of these unsaturated carboxylic acids; unsaturated alcohols such as allyl alcohol, crotyl alcohol, methylvinyl carbinol, allyl carbinol, methylpropenyl carbinol, 4-pentene-l-ol, 10-undecene-1-ol, propargyl alcohol, 1,4-pentadiene3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, $C_nH_{2n-9}OH$ (n is a positive integer), 3 -butene-1,2-diol, 2,5-dimethyl-3-hexene- 2,5-diol, 1,5-hexadiene-3,4-diol, and 2,6-octadiene-4,5-diol and unsaturated amines such as ones where an OH group of these unsaturated alcohols is replaced by an $-NH_2$ group; moreover, low polymers such as butadiene and isoprene (e.g., 500–10,000 in average molecular weight) or high polymers (e.g., at least 10000 in average molecular weitht) to which maleic anhydride or phenols are added or to which an amino group, a carboxylic acid group, a hydroxyl group, an epoxy group, or the like is introduced.

Among these compounds, especially preferred is maleic anhydride.

Furthermore, mention may be made of unsaturated epoxy compounds having an ethylenically unsaturated group and an epoxy group in molecule.

For example, mention may be made of unsaturated glycidyl esters and unsaturated glycidyl ethers represented by the following formulas (1) and (2).

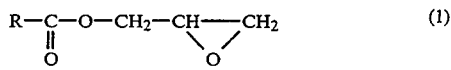 (1)

(R is a hydrocarbon group of 2–18 carbon atoms which has ethylenically unsaturated bond).

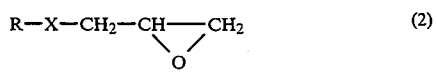 (2)

(R is a hydrocarbon group of 2–18 carbon atoms which has ethylenically unsaturated bond and X is $-CH_2-O-$ or

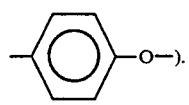).

Examples are glycidyl acrylate, glycidyl methacrylate, glycidyl itaconate esters, allylglycidyl ether, 2-methylallylglycidyl ether, and styrene-p-glycidyl ether.

Other preferable polyfunctional compounds (E) are compounds (G) selected from aliphatic carboxylic acids, acid esters and acid amides represented by the formula: $(R^I\ O)mR(COOR^{II})n(CONR^{III}\ R^{IV})s$ (wherein R represents a straight chain or branched chain saturated aliphatic hydrocarbon group having 2–20 carbon atoms; $R^I$ represents a hydrogen atom or an alkyl, aryl, acyl or carbonyldioxy group having 1–10 carbon atoms; $R^{II}$ represents a hydrogen atom or an alkyl or aryl group having 1–20 carbon atoms; $R^{III}$ and $R^{IV}$ each represents a hydrogen atom or an alkyl or aryl group having 1–10 carbon atoms; m, n and s each represents 0 or an integer of 1 or more and $m+n+s \geq 2$) and derivatives thereof.

Examples of the compounds (G) are hydroxy-acetic acid, lactic acid, α-hydroxy-n-butyric acid, α-hydroxyisobutyric acid, α-hydroxy-n-valeric acid, α-hydroxyisovaleric acid, 2-hydroxy-2-methylbutanoic acid, α-hydroxy-n-caproic acid, α-hydroxyisocaproic acid, 2-ethyl-2-hydroxybutanoic acid, 2-hydroxy-3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpentanoic acid, 1,1-hydroxytetradecanoic acid, jalapinolic acid, 1,4-hydroxyhexadecanoic acid, sabinic acid, juniperic acid, hydroxymalonic acid, methyltartronic acid, ethyltartronic acid, n-propyltartronic acid, isopropyltartronic acid, hydroxymethylmalonic acid, hydroxyisopropylmalonic acid, ethyl-hydroxymethyl-malonic acid, malic acid, α-methylmalic acid, α-hydroxy-α'-methylsuccinic acid, α-hydroxy-α', α'-dimethylsuccinic acid α-hydroxy-α', α'-diethylsuccinic acid, α-hydroxy-α'-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydroxybutyric acid, α,β-dihydroxyisobutyric acid, β,β'-dihydroxyisobutyric acid, β,γ-dihydroxybutyric acid, α,γ-dihydroxy-β, β-dimethylbutyric acid, α, β-dihydroxy-α-isopropylbutyric acid, ipurolic acid, ustilic acid-A, 9,10-dihydroxyoctadecanoic acid, tartaric acid (optically active or racemic body), mesotartaric acid, methyltartaric acid, α,β-dihydroxyglutaric acid, α,γ-dihydroxyglutaric acid, α,γ-dihydroxy-β-methylglutaric acid, α,γ-dihydroxy-β-methyl-β-ethylglutaric acid, α,γ-dihydroxy-α,γ-dimethylglutaric acid, α,δ-dihydroxyadipic acid, β-γ-dihydroxyadipic acid, 6,7-dihydroxydodecanoic diacid, 7,8 -dihydroxyhexadecanoic diacid, furoionic acid, trihydroxybutyric acid, trihydroxyisobutyric acid, trihydroxyglutaric acid, succinic acid, glutaric acid, adipic acid, α-methylglutaric acid, and dodecanoic diacid.

Derivatives of the compounds represented by the above formula are lactones, acid anhydrides, alkali metal salts, alkaline earth metal salts, salts with amines and the like. Examples thereof are β-propiolactone, glycolide, lactide, β-methylpropiolactone, β,β-dimethylpropiolactone, β-n-propylpropiolactone, β-isopropylpropiotactone, β-methyl-β-ethylpropiolactone, γ-butyrolactone, γ-valerolactone, δ-valerolactone, δ-caprolactone, ε-caprolactone, 1,5-hydroxypentadecanoic acid lactone, γ-butyrolactone-α-carboxylic acid, paraconic acid, α-methylparaconic acid, β-methylparaconic acid, α-ethylparaconic acid, α-isopropylparaconic acid, γ-methylparaconic acid, γ-ethylparaconic acid, α,γdimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactone-γ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,βdimethyl-γ-butyrolactone-γ-carboxylic acid, homoisocapric acid, α-(γ-hydroxycarbonylpropyl)-γ-butyrolactone, β-hydroxyadipic acid-γ-lactone, α,δ-dimethyl-β-hydroxyadipic acid-γ-lactone, β-hydroxy-β-methyladipic acid-γ-lactone, α-(δ'-carboxy-n-butyl)-γ-butyrolactone, α-methylisocitric acid lactone, cinchonic acid, α-hydroxy-γ-butyrolactone, β-hydroxy-γ-butyrolactone, δ-hydroxy-γ-valerolactone, pantolactone, mevalonic acid, malic acid anhydride, tartaric acid anhydride, hydroxyglutaric acid anhydride, α,β,γ-trihydroxyvaleric acid lactone, α-hydroxy-α-hydroxymethyl-γ-butyrolactone, succinic acid anhydride, and glutaric acid anhydride. These may be used singly or in combination of two or more.

Of these compounds especially preferred are tartaric acid, malic acid, citric acid and derivatives thereof. These include such acids in commercially available form (such as anhydrous state or hydrated state). Examples of useful derivatives are acetyl citrate, monostearyl citrate, and/or distearyl citrate, N,N'-diethylcitric acid amide, N,N'-dipropylcitric acid amide, N-phenylcitric acid amide, N-dodecylcitric acid amide, N,N'-didodecylcitric acid amide and N-dodecylcitric acid amide, calcium malate, calcium citrate, potassium malate, and potassium citrate.

As other preferable polyfunctional compounds (E), mention may be made of compounds (H) which are characterized by having, in the molecule, simultaneously (a) an acid halide group, preferably an acid chloride group and (b) at least one of a carboxylic acid group, an acid anhydride group, a carboxylic acid ester group and an acid amide group, preferably a carboxylic acid group and a carboxylic acid anhydride group.

As examples of compounds (H), mention may be made of anhydrotrimellitic acid chloride, chloroformylsuccinic acid anhydride, chloroformylsuccinic acid, chloroformylglutaric acid anhydride, chloroformylglutaric acid, chloroacetylsuccinic acid anhydride, chloroacetylsuccinic acid, trimellitic acid chloride and chloroacetylglutaric acid. Anhydrotrimellitic acid chloride is especially suitable.

These compounds (F), (G) and (H) are mentioned in detail in U.S. Pat. Nos. 4,315,086 and 4,642,358. (These are incorporated by reference herein.)

Other preferable polyfunctional compounds (E) are epoxy compounds (J) comprising a compound having an epoxy group in the molecule and/or a condensation polymer of dihydric phenol and epichlorohydrin.

Examples of epoxy compounds (J) are epoxides of olefins or cycloalkenes such as ethylene oxide, propylene oxide and cyclohexene oxide. Furthermore, condensation products of dihydric phenol and epichlorohydrin at various ratios are included andtypical examples thereof are condensates of bisphenol A and epichlohydrin (commercially available products are, for example, SUMIEPOXY ® ELA-115, ELA-127, ELA-128, ELA-134, ESA-011, ESA-0,14, ESA-017, and ESA-019 of Sumitomo Chemical Co. Ltd. and phenol resins of Union Carbide Corp.), condensates of resorcin and epichlorohydrin, condensates of hydroquinone and epichlorohydrin, condensates of tetrabromobisphenol A and epichlorohydrin, and glycidyl etherification products of phenol novolak or cresol novolak (e.g., a series of SUMIEPOXY ® ESCN-220 of Sumitomo Chemical Co., Ltd.).

Furthermore, there are included[condensates of polyhydric alcohols and epichlorohydrin and typical examples of the polyhydric alcohols are ethylene glycol, propylene glycol, butylene glycol, polyethylene glycol, polypropylene glycol, glycerine, trimethylolethane, trimethylolpropane and pentaerythritol.

Further examples are glycidyl etherification products of monohydric phenols or monohydric alcohols such as phenylglycidyl ether, butylglycidyl ether and cresylglycidyl ether.

Further, mention may be made of glycidylation products of amine compounds (commercially available are SUMIEPOXY ® ELN-125 of Sumitomo Chemical Co. Ltd. which is a diglycidylation product of aniline).

Furthermore, there may be used polymers of epoxy-containing unsaturated compounds (such as glycidyl acrylate, glycidyl methacrylate, and allyl glycidyl ether) and copolymers of epoxy-containing unsaturated compound and at least one of other monomers (such as ethylene, propylene, butene, styrene, α-methylstyrene, 4-methyl-pentene, chlorostyrene, bromostyrene, acrylic acid, acrylic acid esters, acrylonitrile, vinyl chloride, methacrylic acid, methacrylic acid esters, maleic anhydride, and vinyl acetate). Of these polymers especially preferred are styrene-glycidyl acrylate or methacrylate copolymers and ethylene-glycidyl acrylate or methacrylate copolymers and further preferred are ethylene-glycidyl methacrylate copolymer, ethylene-glycidyl methacrylate-vinyl acetate copolymer and ethylene-glycidyl methacrylate-methyl acrylate copolymer.

As other preferable polyfunctional compounds (E), mention may be made of organosilane compounds (K) which have in the molecule simultaneously (a) at least one silicon atom which bonds to a carbon atom through an oxygen atom, (b) carbon-carbon double bond or carbon-carbon triple bond, and (c) at least one functional group selected from an amino group, a mercapto group, a carboxylic acid group, an acid anhydride group, an acid amide group, a carboxylic acid ester group, an imide group and a hydroxyl group.

In these compounds (K), a C-O-Si component is usually present as an alkoxy group or an acetoxy group which directly bonds to a silicon atom. Such an alkoxy group or an acetoxy group generally has less than 15 carbon atoms and may contain a heteroatom (e.g., oxygen). Further, in these compounds, two or more silicon atoms may be present. When two or more silicon atoms are present, these are bonded through an oxygen bond (e.g., in case of siloxane), a silicon-silicon bond, or a bifunctional organic group (e.g., a methylene group or a phenylene group).

Examples of suitable organosilane compounds (K) are γ-aminopropyltriethoxysilane, 2-(3-cyclohexenyl)ethyltrimethoxysilane, 1,3-divinyltetraethoxysilane, vinyltris(2-methoxyethoxy)silane, 5-bicycloheptenyltriethoxysilane and γ-mercaptopropyltrimethoxysilane.

As other preferable polyfunctional compounds (E), mention may be made of olefin polymer compounds (P) having a carboxylic acid group in molecule.

As examples of polymer compounds (P), mention may be made of ethylene-acrylic acrid copolymer, ethylene-methacrylic acid copolymer, ethylene-acrylic acid-ethyl acrylate copolymer, ethylene-methacrylic acid-ethyl acrylate copolymer, and alkali metal salts thereof (ionomers).

These olefin polymer compounds (P) can be produced, for example, by copolymerizing an olefin and a compound having a carboxylic acid group in main chain in the presence of a polymerization initiator and a catalyst. Generally, it is possible to produce them by known high-pressure radical polymerization method mentioned below. They are obtained by copolymerization of ethylene and a radical copolymerizable monomer (comonomer) using a free radical initiator such as organic peroxide or oxygen. The copolymerization reaction is carried out normally at a polymerization temperature of 130°–300° C. and under a polymerization pressure of 500°–3,000 kg/cm$^2$.

The radical copolymerizable monomers include, for example, unsaturated carboxylic acids such as acrylic acid and methacrylic acid and esterification products thereof, and vinyl esters such as vinyl acetate. As the esterification products of unsaturated carboxylic acid, mention may be made of methyl acrylate, ethyl acrylate, and methyl methacrylate. These comonomers may be used singly or in combination of two or more.

Content of comonomer contained in olefin polymer compounds (P) is 0.1–40% by weight, preferably 1–35% by weight. When content of comonomer is less than 0.1% by weight, modification effect cannot be obtained.

Among them, preferred are ethylene-acrylic acid copolymer and ethylene-methacrylic acid copolymer.

Amounts of compounds (E) or (F), (G), (H), (J), (K) and (P) can be variously selected depending on object, but is generally 200 parts by weight or less, preferably 80 parts by weight or less, more preferably 20 parts by weight or less, and most preferably 0.01–10 parts by weight per 100 parts by weight of polyphenylene ether.

In modification of polyphenylene ether with the above-mentioned compounds (E) or (F), (G), (H), (J), (K) and (P), radical initiators may be used in some case. The radical initiators include known organic peroxides and diazo compounds. Preferred examples are benzoyl peroxide, dicumyl peroxide, di-tert-butyl peroxide, tert-butylcumyl peroxide, tert-butyl hydroperoxide, cumene hydroperoxide, and azobisisobutyronitrile. Amount of the radical initiators is 0.01–10 parts by weight, ]preferably 0.1–5 parts by weight per 100 parts by weight of polyphenylene ether.

With reference to the modified polyphenylene ether, it may be a chemical reaction product of the above compound with polyphenylene ether or the above compound and polyphenylene ether may be combined through physical interaction (e.g., physical adsorption to polyphenylene ether).

Furthermore, preferable modified polyphenylene ethers in the present invention include those which are obtained by graft polymerizing the unsaturated monomers (L) other than the above unsaturated polyfunctional compounds (E) or the polyfunctional compounds (E) and unsaturated monomers (L) other than potyfunctional compounds (E) on polyphenylene ether in the presence of radical initiators.

Such unsaturated monomers (L) include preferably vinyl and/or vinylidene compounds (N) other than polyfunctional compounds (E). Examples of the compounds (N) are shown below.

Aromatic vinyl or vinylidene compounds such as styrene, α-methylstyrene, o, m, and p-methylstyrenes, chlorostyrene, bromostyrene, divinylbenzene, hydroxystyrene, and aminostyrene; olefins such as ethylene, propylene, butene-1, pentene-1, hexene-1, -methylpentene-1, octene-1, decene-1, and octadecene; cyanovinyl compounds such as acrylonitrile and methacrylonitrile; vinyl ester compounds such as vinyl acetate; vinyl ether compounds such as methylvinyl ether, ethylvinyl ether, and butylvinyl ether; and unsaturated halogen compounds such as vinyl chloride and vinylidene chloride. These may be used singly or in combination of two or more. The most preferred unsaturated monomer to be graft copolymerized is styrene. The most preferred combinations of compounds (N) and compounds (E) are styrene-glycidyl methacrylate, styrene-glycidyl acrylate, styrenemaleic anhydride, styrene-acrylic acid and styrenemethacrylic acid.

Amount of unsaturated monomer (L) in the present invention is 200 parts by weight or less, preferably 0.5–100 parts by weight, more preferably 1–50 parts by weight per 100 parts by weight of polyphenylene ether.

There is no limitation in process for production of modified polyphenylene ether in the present invention and known processes can be used and examples are as follows.

(1) Polyphenylene ether and the above compound in the form of pellets, powders, or fine pieces are uniformly mixed by high-speed stirrers and melt kneaded.

(2) The above compound is added to a solution prepared by dissolving polyphenylene ether in a solvent or swelling polyphenylene ether with a solvent to dissolve the compound therein or swell the compound therewith, followed by heating with stirring.

(3) The above compound is added to polyphenylene ether and the mixture is dispersed in water, followed by heating with stirring.

In the case of (3), it is preferred to use dispersion stabilizers such as polyvinyl alcohol, sodium dodecylbenzenesulfonate, and calcium phosphate. In some case, there may be added a solvent in which polyphenylene ether is dissolved or with which polyphenylene ether is swollen.

In the process of (1), temperature and time for melt kneading have no special limitation. Temperature somewhat varies depending on kinds and amount of the compounds, but is generally 150°–350° C. Apparatuses for melt kneading can be any of those used for methods which can handle a melt viscous material and either batch method or continuous method can be employed. Examples are single-screw or multi-screw extruders, Banbury mixer, roll, and kneader.

The solvent used in the process of (2) is not critical and may be one which can dissolve or swell polyphenylene ether.

As examples of the solvents, mention may be made of chloroform, methylene chloride, benzene, xylene, chlorobenzene, cyclohexane, styrene, toluene, and o-chlorophenol. Mixed solvents may be used as far as they can dissolve or swell polyphenylene ether. Temperature and time for mixing are not critical and generally temperature is 20°–250° C. and time is 1 minute—10 hours.

When modified polyphenylene ether is used in the present invention, preferably modified polyphenylene ether is previously prepared and then this is mixed with other components to obtain the thermoplastic resin composition of the present invention. However, it is also possible to produce the thermoplastic resin composition by simultaneously mixing the above-mentioned compound as a modifier, polyphenylene ether and other components.

In the present invention, a composition comprising polyphenylene ether or modified polyphenylene ether and aromatic vinyl polymer resin (M) may also be used as polyphenylene ether resin (B). The aromatic vinyl polymer resin (M) here means an aromatic vinyl polymer, a copolymer of aromatic vinyl compound with other monomer, or a rubber modified aromatic vinyl polymer.

Aromatic vinyl polymer resins (M) are selected from those which have at least 25% by weight of polymer unit derived from a monomer having the following formula:

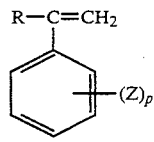

[wherein R represents a hydrogen atom, a lower alkyl group (such as an alkyl group of 1–4 carbon atoms) or a halogen atom, Z represents a hydrogen atom, a vinyl group, a halogen atom, an amino group, a hydroxyl group or a lower alkyl group, and p represents 0 or an integer of 1–5].

As examples of aromatic vinyl polymers and copolymers of aromatic vinyl compounds and other monomers, mention may be made of homopolymers such as polystyrene, polychlorostyrene, and poly-α-methylstyrene and copolymers thereof, and styrene-containing copolymers such as styrene-acrylonitrile copolymer, styrene-maleic anhydride copolymer, styrene-glycidyl methacrylate copolymer, styrene-acrylic acid copolymer, styrene-N-phenylmaleimide copolymer, styrene-divinylbenzene copolymer, and styrene-acrylonitrile-α-methylstyrene copolymer. Among them, preferred are polystyrene, styrene-α-methylstyrene copolymer, styrene-acrylonitrile copolymer, styrene-α-chlorostyrene copolymer, styrene-methyl methacrylate copolymer, styrene-glycidyl methacrylate copolymer, styrene-maleic anhydride copolymer and styrene-acrylic acid copolymer.

The rubber modified aromatic vinyl polymers are those which comprise aromatic vinyl polymer or copolymer matrix in which rubber particles are dispersed to form a two-phase system. They can be produced by mechanical mixing of the rubber-like material (C) mentioned below and aromatic vinyl polymer or copolymer or by dissolving rubber-like material in aromatic vinyl compound monomer, followed by polymerizing the aromatic vinyl compound monomer therewith. According to the latter method, so-called high-impact strength polystyrenes are industrially produced.

The rubber-like material (C) used in the present invention is at least one selected from natural and synthetic elastomeric polymers which are elastic at 20°–25° C. and modified elastomeric polymers obtained by modifying the above elastomeric polymers with at least one compound selected from polyfunctional compounds (E) and unsaturated monomers (L) in the presence or absence of a radical initiator.

Examples of the elastomeric polymers are natural rubber (NR), diene rubbers [such as polybutadiene (BR), polyisoprene (IR), and polychloroprene (CR)]and copolymers of diene and vinyl monomer [such as styrene-butadiene random copolymer (SBR), styrene-butadiene block copolymer (SB), styrene-butadiene-styrene block copolymer (SBS), styrene-isoprene random copolymer, styrene-isoprene block copolymer (SI), styrene-isoprene-styrene block copolymer (SIS), polybutadiene on which styrene is graft copolymerized, isoprene-acrylonitrile copolymer (NIR), butadiene-acrylonitrile copolymer (NBR)], or hydrogenated products of these copolymers, polyiso-butylene (PIB), copolymers of isobutylene and butadiene or isoprene (IIR), ethylene-α-olefin copolymer, ethylene-α-olefin-non-conjugated diene copolymer, ethylene-alkyl acrylate copolymers (such as ethylene-ethyl acrylate copolymer and ethylenebutyl acrylate copolymer), polysulfide rubbers (T) such as thiokol rubber, acrylic rubbers (ACM,ANM), polyurethane rubber (U), polyether rubber, epichlorohydrin rubbers (CHR, CHC), polyester elastomer and polyamide elastomer.

These elastomeric polymers can be produced by various processes such as emulsion polymerization, solution polymerization and bulk polymerization, using various catalysts such as peroxides, trialkyl-aluminum, lithium halides and nickel-based catalysts.

Furthermore, there may also be used those which have various crosslinking degrees, various proportions of micro structures such as cis structure, trans structure and a vinyl group. In case of diene rubbers and copolymers of dienes and vinyl compounds, those which are variously different in micro structure of double bond (vinyl group, cis-1,4 bond, trans 1,4-bond) are also used as elastomeric polymers of the present invention.

Further, random copolymers, block copolymers, and the like are used as the elastomeric polymers of the present invention.

Moreover, these elastomeric polymers may also be produced by copolymerization with other dienes.

Methods for the copolymerization may be any methods such as random copolymerization, block copolymerization and graft copolymerization. Examples of the monomers include butadiene, isoprene, and chlorobutadiene.

Preferred elastomeric polymers include copolymers comprising 40–100% by weight of butadiene and 60–0% by weight of styrene, copolymers comprising 35–82% by weight of butadiene and 35–18 by weight of acrylonitrile, styrene-butadiene and styrene-butadiene-styrene block copolymers (including all of linear block copolymers, radial block copolymers, etc.) and hydrogenated products thereof (SEB, SEBS), styrene-isoprene and styrene-isoprene-styrene block copolymers and hydrogenated products thereof (SEP, SEPS), styrene grafted polybutadiene (obtained by adding styrene to polybutadiene or butadienestyrene copolymer latex and graft copolymerizing it with a radical initiator), ethylene-α-olefin copolymer and ethylene-α-olefin-non-conjugated diene copolymer.

The ethylene-α-olefin copolymer rubbers include, for example, copolymers of ethylene with other α-olefins such as propylene, 1-butene, 1-pentene, 1-hexene, 4-methyl-1-pentene, and 1-octene and terpolymer rubbers such as ethylene-propylene-1-butene copolymer, among which ethylene-propylene copolymer rubber (EPR) and ethylene-1-butene copolymer rubber (EBR) are preferred.

Ethylene content in the ethylene-α-olefin copolymer rubber is 15–85% by weight, preferably 40–80% by weight. That is, crystalline copolymers which have an ethylene content of more than 85% by weight are difficult to be processed under normal rubber molding conditions and those which have an ethylene content of less than 15% by weight are high in glass transition temperature (Tg) and lose elastic properties.

Number-average molecular weight of ethylene-α-olefin copolymer rubbers is such that they can be kneaded in extruders and is 10,000-100,000. If the molecular weight is too low, handling at feeding to the extruders is difficult and if it is too high, flowability is so small that processing is difficult.

Molecular weight distribution of ethylene-α-olefin copolymer rubbers also has no special limitation and there may be used any copolymer rubbers having various molecular weight distribution such as monomodal type and bimodal type which are usually commercially prepared and sold.

Value Q of molecular weight distribution (weight-average molecular weight/number-average molecular weight) is preferably 1-30, more preferably 2-20.

Ethylene-α-olefin-non-conjugated diene copolymer rubber can also be used, but non-conjugated diene content in raw material rubber is preferably 3% by weight or less. When non-conjugated diene content is more than 3% by weight, there occurs gelation at kneading and this is not preferred.

That is, the copolymer rubbers are those which are produced using so-called Ziegler-Natta catalyst which is an ordinary production catalyst and, for example, combination of an organoaluminum compound with a tri~pentavalent vanadium compound soluble in hydrocarbon solvents is used as the catalyst. As the aluminum compound, there may be used alkylaluminum sesquichloride, trialkylaluminum, dialkylaluminum monochloride, or mixtures thereof and as the vanadium compound, there may be used vanadium oxytrichloride, vanadium tetrachloride or vanadate compounds represented by $VO(OR^8)_q X_{3-q}$ ($0 < q \leq 3$, $R^8$ is a straight chain or cyclic hydrocarbon of 1-10 carbon atoms).

Among styrene block copolymers, especially preferred are partially hydrogenated styrene-butadiene block copolymer or partially hydrogenated styrene-isoprene block copolymer which is a hydrogenated product. These are produced by hydrogenation treatment of styrene-butadiene block copolymer and styrene-isoprene block copolymer, respectively. Structure and process for production will be explained below.

As the partially hydrogenated styrene-butadiene block copolymer and partially hydrogenated styrene-isoprene block copolymer (hereinafter referred to as "hydrogenated block copolymer"), there may be used hydrogenated block copolymers in which number-average molecular weight of block copolymer rubber is 10,000-1,000,000, preferably 20,000-300,000, number-average molecular weight of aromatic vinyl polymer block A in block copolymer rubber is 1,000-200,000, preferably 2,000-100,000, number-average molecular weight of conjugated diene polymer block B is 1,000-200,000, preferably 2,000-100,000 and weight ratio of aromatic vinyl polymer block A and conjugated diene polymer B is 2/98-60/40, preferably 10/90-40/60.

For production of block copolymer rubbers, many processes have been proposed and according to a representative process which is disclosed in Japanese Patent Kokoku No. 40-23798, a block copolymer rubber of aromatic vinyl hydrocarbon and diene hydrocarbon can be obtained by block copolymerization in an inert solvent using a lithium catalyst or a Ziegler type catalyst.

A hydrogenation treatment of these block copolymer rubbers is carried out in an inert solvent in the presence of a hydrogenation catalyst by the processes disclosed, for example, in Japanese Patent Kokoku Nos. 42-8704, 43-6636 and 46.-20814. Hydrogenation rate is at least 50%, preferably at least 80% of polymer block B and 25% or less of aromatic unsaturated bond in polymer block A is nuclear-hydrogenated. Representative examples of such partially or completely hydrogenated block copolymers are thoses which are sold in the tradename of KRATON ®-G by Shell Chemical Co., U.S.A.

The modified elastomeric polymers in the present invention are those which are obtained by modifying elasnomeric polymers with at least one modifier selected from polyfunctional compounds (E) having at least one of a carboxylic acid group, an acid anhydride group, an acid amide group, an imide group, a carboxylic acid ester group, an epoxy group, an amino group, and a hydroxyl group in molecule and unsaturated monomers (L) other than the polyfunctional compounds (E) in the presence or absence of a radical initiator. These modifiers and amount of modifiers have already mentioned in the part of explanation on process for production of modified polyphenylene ether.

For production of modified elastomeric polymer, known processes may be used and specifically those which have been mentioned in the part on production of modified polyphenylene ether may be employed.

In the present invention, as one of preferred embodiments for production of modified ethylene-α-olefin copolymer rubber-modified hydrogenated block copolymer, it can be obtained by graft copolymerization using unsaturated carboxylic acid or derivative thereof as modifiers (hereinafter referred to as "graft monomer"), preferably in combination with aromatic vinyl monomer for respective starting materials and, if necessary, in the presence of a radical initiator. Process for production of the modified elastomeric polymers will be specifically explained below.

Various known processes can be employed for graft copolymerization of graftable monomer on the starting elastomeric polymers in production of the modified elastomeric polymers.

For example, there are a process which comprises mixing a starting elastomeric polymer, a graftable monomer and a radical initiator and melt kneading the mixture in a melt kneading apparatus to perform grafting, a process which comprises dissolving a starting elastomeric polymer in an organic solvent such as xylene, then adding a radical initiator in nitrogen atmosphere, heating the mixture to allow a reaction to proceed under stirring, followed by cooling, washing, filtering and drying to obtain grafted elastomeric polymer, a process which comprises irradiating a starting elastomeric polymer with ultraviolet ray or radiation in the presence of a graftable monomer, and a process of contacting with oxygen or ozone.

The process of carrying out graft copolymerization by melt kneading in melt kneading apparatuses is most preferred from an economical viewpoint.

The modified elastomeric polymers can be obtained by melt kneading starting elastomeric polymers, unsaturated carboxylic acids or derivatives thereof and, if necessary, in the presence of radical initiators or starting elastomeric polymers, unsaturated carboxylic acids or derivatives thereof, preferably in combination with aromatic vinyl monomers and, if necessary, in the presence of radical initiators a temperature of 200°-280° C., preferably 230°-260° C. and for a residence time of 0.2-10 minutes which varies depending on kind of radical initiators by an extruder, Banbury mixer, a kneader and the like.

When kneading is carried out in the presence of too much oxygen, gel-like materials may be produced or considerable coloration may occur and so kneading is preferably carried out in the presence of substantially no oxygen.

Furthermore, when kneading temperature is lower than 200° C., desired addition amount of unsaturated carboxylic acids or derivatives thereof is not obtained and besides, only a small effect can be obtained on improvement of graft reaction amount. Even if the temperature exceeds 280° C., effect of improvement of reaction amount is small and in some case, there may cause production of gel-like materials or coloration.

Kneading machines used for modification have no special limitation, but it is generally preferred to use extruders because continuous production is possible. The extruders preferably have screws suitable for uniform mixing of various starting materials supplied through single or twin-screws. In order to remove from reaction product unaltered components (unsaturated carboxylic acids or derivatives thereof, aromatic vinyl monomers, radical initiators) and side-reaction products such as oligomers and decomposition products of the unaltered components, there may be carried out suction by vacuum pumps from vent lines in the midway or in the vicinity of exits of the extruders or purification by dissolving the reaction product in a suitable solvent and then precipitating it. It is also possible to conduct the heat treatment at higher than 60° C. or drawing under vacuum and melting.

The above three components or four components can be respectively separately fed to kneading machines or a part or all of them can be previously uniformly mixed and then fed to the kneading machines. For example, elastomeric polymers are impregnated with radical initiators and aromatic vinyl monomers and are fed simultaneously with unsaturated carboxylic acid or derivatives thereof at the time of kneading and then these are kneaded. Furthermore, modification can also be carried out by feeding radical initiators, unsaturated carboxylic acids or derivatives thereof, or aromatic vinyl monomers from the points in the midway of extruders.

If necessary, various additives such as antioxidants, heat stabilizers, light stabilizers, nucleating agents, lubricants, antistatic agents, inorganic or organic colorants, rust preventers, crosslinking agents, foaming agents, plasticizers, fluorescent agents, surface smoothing agents, and surface gloss improvers can be added to the modified elastomeric polymer at the preparation step or subsequent processing step.

Unsaturated carboxylic acids or derivatives thereof and radical initiators used for modified elastomeric polymer can be selected from compounds used for production of graft polypropylene. As aromatic vinyl monomers, styrene is most preferred, but o-methylstyrene, p-methylstyrene, α-methylstyrene, vinyltoluene, and divinylbenzene may also be used. These may also be used in admixture.

In production of modified elastomeric polymers, aromatic vinyl monomers are used for inhibition of gel formation and improvement of graft reaction amount. Amount of aromatic vinyl monomers used per 100 parts by weight of the starting elastomaric polymers is preferably 0.2-20 parts by weight and amount of unsaturated carboxylic acids or derivatives thereof are preferably 0.5-15 parts by weight. When aromatic vinyl monomers are used, amount of unsaturated carboxylic acids or derivatives thereof used are preferably 0.5-15 parts by weight and weight ratio of aromatic vinyl monomers/unsaturated carboxylic acids or derivatives thereof is preferably 0.1-3.0, more preferably 0.5-2.0.

When the weight ratio of aromatic vinyl monomers to unsaturated carboxylic acids or derivatives thereof is lower than 0.1, effects of inhibition of gel formation and an improvement in graft reaction amount are not seen and even when it is used at the weight ratio higher than 3.0, no further preferable effect can be expected.

Amount of radical initiators varies depending on kind of radical initiators and kneading conditions, but is usually 0.005-1.0 part by weight, preferably 0.01-0.5 part by weight per 100 parts by weight of the starting elastomeric polymers. When it is less than 0.005 part by weight, desired addition amount of unsaturated carboxylic acids or derivatives thereof cannot be obtained and effect of increasing of addition amount of unsaturated carboxylic acids or derivatives thereof due to use of aromatic vinyl monomers used in combination is small. When it is more than 1.0 part by weight, gel-like materials are produced and this is not preferred.

The thus obtained modified elastomeric polymers have addition amount of unsaturated carboxylic acids or its derivatives of 0.1-5% by weight and preferably has an addition amount of aromatic vinyl monomers of 0.1-5% by weight and preferably has a Mooney viscosity ($ML_{1+4}$, 121° C.) of 5-120.

Dinitrodiamines (D) which play the most important part for improving compatibility between the polyolefin resin (A) and the polyphenylene ether resin (B) in the composition of the present invention are those which are represented by the formula (I):

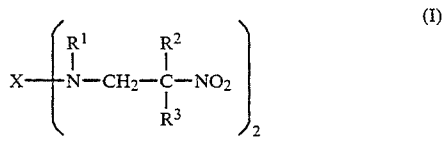

(wherein X is a divalent chain aliphatic group, a cyclic aliphatic group or an aromatic group which may contain a halogen or oxygen atom; $R^1$ is a hydrogen atom, a chain aliphatic group, a cyclic aliphatic group, or an aromatic group, and when both X and $R^1$ are chain aliphatic groups, the nitrogen atoms may further bond each other to form a ring through X and $R^1$; and $R^2$ and $R^3$ are independently a hydrogen atom or an alkyl group or 1-12 carbon atoms, and $R^2$ and $R^3$ may bond to form a ring).

Dinitrodiamines represented by the formula (I) can be easily produced by condensation reaction of diamines, nitroalkanes and formaldehyde as starting materials in inert solvents such as methanol. A small amount of an alkaline compound may be used as a catalyst for acceleration of reaction in production.

The following compounds can be exemplified as compounds comprising such dinitrodiamines. In the examples, —Z represents

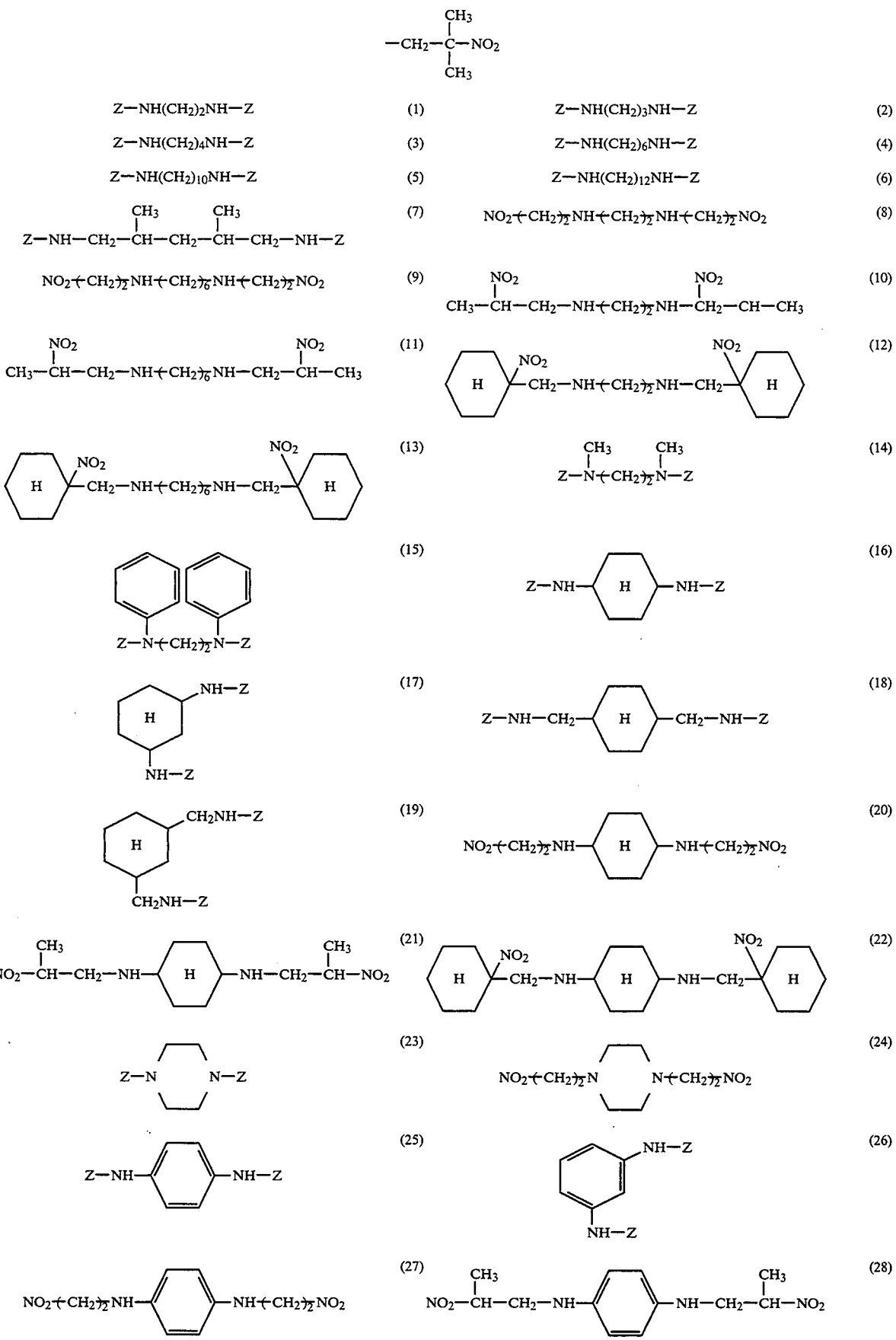

-continued
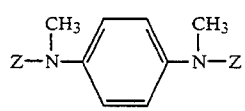 (29)
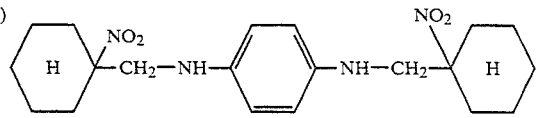 (30)
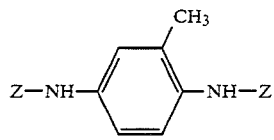 (31)
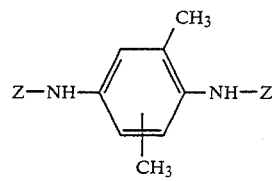 (32)
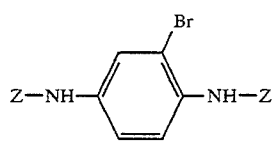 (33)
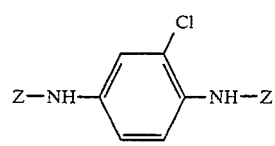 (34)
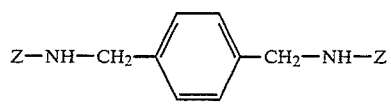 (35)
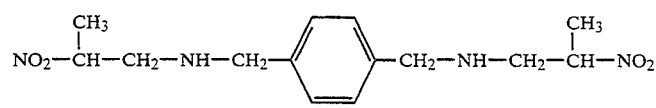 (36)
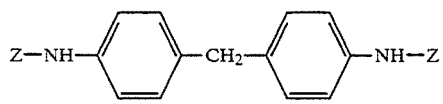 (37)
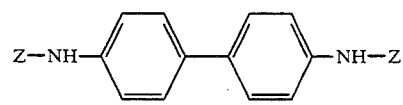 (38)
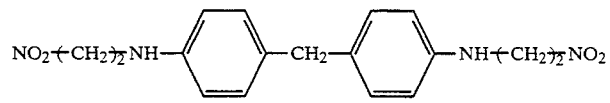 (39)
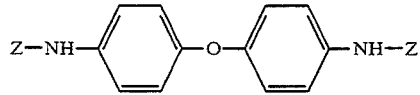 (40)
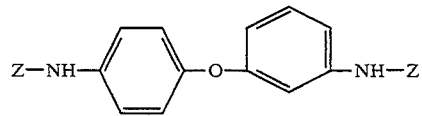 (41)
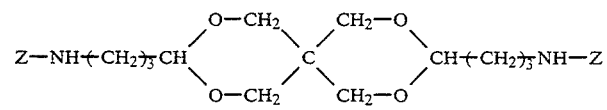 (42)
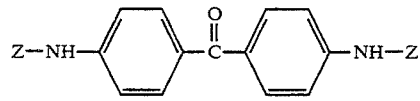 (43)
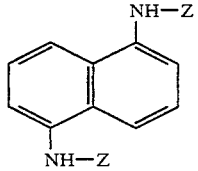 (44)
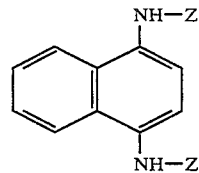 (45)
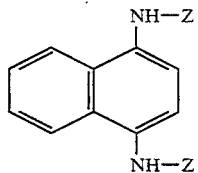 (45)
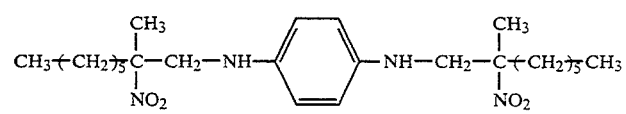 (46)

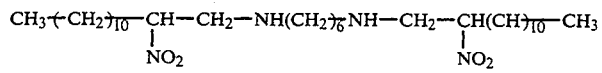

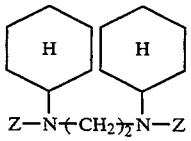

As shown above, substituent X in the formula (I) is a divalent chain aliphatic group, cyclic aliphatic group or aromatic group and can contain halogen as in the above examples (33) and (34) and moreover, can contain oxygen as in examples (40)–(43). Among them, suitable are chain aliphatic groups, especially those of 4–12 carbon atoms.

$R^1$ in the formula (I) is a hydrogen atom, a chain aliphatic group, a cyclic aliphatic group or an aromatic group and when X and $R^1$ are both chain aliphatic groups, there are included such cases where nitrogen atoms further bond each other to form a ring through X and $R^1$, and X, $R^1$ and two nitrogen atoms bond together to form a ring as shown in the above examples (23) and (24).

$R^2$ and $R^3$ in the formula (I) may be identical or different and are independently a hydrogen atom or an alkyl group of 1–12 carbon atoms. $R^2$ and $R^3$ may bond to each other to form a ring as in the above examples (12), (13), (22) and (30).

Compounds (D) comprising the dinitrodiamines as shown above may be single compound or mixture of two or more compounds or mixture with fillers such as silica and talc or with other ad. ditives. Therefore, they. may be used in any of these forms.

The thermoplastic resin composition of (A)/(B)/(D) or (A)/(B)/(C)/(D) of the present invention is excellent in mechanical properties and solvent resistance. In some case, flowability is further required depending on molding methods. Especially, in the case of injection molding, a high flowability is required. In order to improve flowability, it is preferred to further add polyolefin and/or elastomeric polymers to the compositions of (A)/(B)/(D) or (A)/(B)/(C)/(D). These compositions are also thermoplastic resin compositions of the present invention.

In practice of the present invention, other polymer compounds or aids can also be added to the thermoplastic resin compositions of the present invention. Other polymer compounds include, for example, polymers such as polyvinyl chloride, polymethyl methacrylate, polyvinyl acetate, polyvinylpyridine, polyvinylcarbazole, polyacrylamide, and polyacrylonitrile, polycarbonate, polysulfone, polyether sulfone, polyethylene terephthalate, polybutylene terephthalate, polyarylene ester (such as U polymer of Unitika, Ltd.), polyphenylene sulfide, polyamides such as 6-nylon, 6,6-nylon, and 12-nylon; condensation polymer compounds such as polyacetal; and various thermosetting resins such as silicone resin, fluororesin, polyimide, polyamideimide, phenolic resin, alkyd resin, unsaturated polyester resin and Dapon resin.

Polyesters or polyamides are preferred among the above polymer compounds.

In the present invention, fillers may be used for reinforcement, imparting function or extending (cost-cutting) to obtain thermoplastic resin compositions.

As fillers, there may be used fibers such as glass fibers, carbon fibers, polyamide fibers, metallic fibers, e.g., aluminum and stainless steel, and metal whisker, and inorganic fillers such as silica, alumina, calcium carbonate, talc, mica, clay, kaolin, magnesium sulfate, wallastonite, carbon black, $TiO_2$, ZnO, and $Sb_2O_3$.

All of these fillers can be used. for reinforcement. Fillers such as carbon fibers, metallic fibers, and carbon black can reduce surface resistivity and volume resistivity and can impart electrical conductivity to the thermoplastic resin compositions of the present invention. Fillers cheaper than resins can be used as extenders to attain cost-cutting.

When stiffness and heat resistance of the thermoplastic resin compositions of the present invention are to be improved, it is especially preferred to use inorganic fillers such as glass fibers, potassium titanate whisker, talc, mica, and calcium carbonate or carbon fibers.

It is one of the preferred embodiments to use the thermoplastic resin compositions as a composite which additionally contains flame retardants or flame retardant aids such as $Sb_2O_3$, halides, and phosphate esters, lubricants, nucleating agents, plasticizers such as triphenyl phosphate and phthalate esters, dyes, pigments, antistatic agents, antioxidants, and weathering resistance imparting agents.

In the composition (R-1) comprising the polyolefin-resin (A) and the polyphenylene-etherresin (B) in the present invention, the polyolefinresin (A) is contained in an amount of 95–5% by weight, preferably 90–20% by weight and the polyphenylene-ether-resin (B) is in an amount of 5–95% by weight, preferably 10–80% by weight. When the polyolefin-resin (A) is in an amount of less than 5% by weight, processability, toughness, water resistance, organic solvent resistance, and chemical resistance are not sufficient and when it is in an amount of more than 95% by weight, heat resistance and stiffness are not sufficient.

In the composition (R-2) comprising the polyolefin-resin (A), the polyphenylene-ether-resin (B) and the rubber-like materials (C) in the present invention, the polyolefin-resin (A) is contained in an amount of 94–2% by weight, preferably 90–20% by weight and the polyphenylene-ether-resin (B) is contained in an amount of 2–94% by weight, preferably 10–80% by weight. When amount of the polyolefin-resin (A) is less than 2% by weight, processability, toughness, water resistance, organic solvent resistance, and chemical resistance are not 10 sufficient and when it is more than 94% by weight, heat resistance and stiffness are not sufficient. Furthermore, the rubber-like material (C) used for an improvement in impact resistance is added in an amount of 1-50% by weight, preferably 3-35% by weight, more preferably 5-25% by weight. When amount of the rubber-like material (C) is less than 1% by weight, this is insufficient for improving impact resistance and when it is more than 50% by weight, deterioration in heat resistance and stiffness is conspicuous and desired results cannot be obtained.

Dinitrodiamines (D) are added in an amount of 0.001-10 parts by weight, preferably 0.01-8 parts by weight, more preferably 0.1-5 parts by weight per 100 parts by weight of the composition (R-1) or (R-2). When amount of the dinitrodiamine is less than 0.001 part by weight, effect to improve compatibility is small and when it is more than 10 parts by weight, the effect reaches saturation and it remains as unaltered matter in the polymer and emits offensive odor and besides deterioration of properties is brought about and thus good results are not obtained.

To 100 parts by weight of the thermoplastic resin composition comprising the composition (R-1) or the (R-2) and a dinitrodiamine (D) are added 1-1800 parts by weight of the polyolefin and/or 1-100 parts by weight of the elastomeric polymers, whereby a thermoplastic resin composition excellent in flowability and properties can be obtained. Amount of the polyolefin must be less than 95% by weight based on the total amount of this polyolefin and the polyolefin-resin (A) contained in the composition (R-1) or (R-2). When this is 95% by weight or more, compatibility with the polyphenylene-ether-resin (B) reduces to cause deterioration of properties.

When the elastomeric polymers are added to 100 parts by weight of thermoplastic resin compositions comprising the composition (R-1) and the dinitrodiamines (D) and when the amount thereof is less than 1 part by weight, an improvement in impact resistance is insufficient and when it is more than 100 parts by weight, deterioration of heat resistance and stiffness is conspicuous and good results are not obtained. When the elastomeric polymers is added to the thermoplastic resin composition comprising the composition (R-2) and the dinitrodiamines (D), amount of the elastomeric polymers is less than 95% by weight based on the total amount of the rubberlike materials (C) in the composition (R-2) and the elastomeric polymers added. Use of the elastomeric polymers and the rubber-like materials (C) in combination gives good result in flowability, but when amount of the elastomeric polymers is 95% by weight or more, compatibility with the polyphenylene-ether-resin (B) lowers and properties are deteriorated.

Method for producing the thermoplastic resin compositions of the present invention has no special limitation and ordinary known methods can be employed.

A method in which the components are mixed in the form of solution and the solvent is evaporated or in which the components are precipitated in a non-solvent, is effective. However, from an industrial viewpoint, a method of kneading them in molten state is employed in practice. Melt kneading is carried out using a kneading machine as generally-used single-screw or twin-screw extruders, Banbury mixer, roll, and various kneaders. A twin-screw extruder is especially preferred.

In kneading, it is preferred to previously uniformly mix respective resin components in the form of powder or pellet using such a device as a tumbler or a Henschel mixer. However, if necessary, each resin component may be separately fed directly to a kneading apparatus in a fixed amount without the mixing.

Preferable method for producing the thermoplastic resin compositions of the present invention is mentioned below. First, the composition (R-1) (polyolefin-resin (A)/polyphenylene-ether-resin (B)) or the composition (R-2) ((A)/(B)/rubberlike materials (C)), a modifier and a radical initiator are melt kneaded using a high-kneading twin-screw extruder to prepare the composition (R-3) or (R-4) and then, dinitrodiamines (D) and, if necessary, polyolefin and/or elastomeic polymers are added to the resulting composition (R-3) or (R-4), followed by melt kneading to obtain the thermoplastic resin compositions.

The compositions (R-3) and (R-4) can be produced specifically by the following process.

The composition (R-3) can be produced by adding to 100 parts by weight of the composition (R-1) 0.01-20 parts by weight of polyfunctional compounds (E) containing 0.01-20 parts by weight of unsaturated monomers (L) or not, and 0.001-10 parts by weight of radical initiators and melt kneading them.

The composition (R-4) can be produced by adding to 100 parts by weight of the composition (R-2) 0.01-20 parts by weight of the polyfunctional compound (E) containing 0.01-20 parts by weight of unsaturated monomer (L) or not, and 0.001-10 parts by weight of radical initiators and melt kneading them.

Amount of the polyfunctional compound (E) used in production of the composition (R-3) or (R-4) is preferably 0.05-10 parts by weight, more preferably 0.1-5 parts by weight and when the unsaturated monomers (L) are used, amount thereof is preferably 0.05-10 parts by weight, more preferably 0.1-5 parts by weight. Amount of the radical initiators is 0.001-10 parts by weight, preferably 0.005-5 parts by weight, more preferably 0.1-2 parts by weight.

When amount of the polyfunctional compound (E) is less than 0.01 part by weight, effect of modification of the composition (R-1) or (R-2) is small and when it is more than 20 parts by weight, modification effect reaches saturation and conspicuous effect is not exhibited and besides, it remains as unaltered material in the polymer and emits offensive odor and further deteriorates properties. Thus, good results cannot be obtained.

When an addition amount of the radical initiators is less than 0.001 part by weight, effect on grafting reaction of the polyfunctional compounds (E) and the unsaturated monomers (L) is small and when it is more than 10 parts by weight, further conspicuous effect on grafting reaction of the polyfunctional compounds (E) and the unsaturated monomers (L) is not exhibited and decomposition or crosslinking of polyolefins occurs much and change in flowability (melt flow rate) is great and such are practically not preferred.

Addition amount of the dinitrodiamines (D) is 0.001-10 parts by weight, preferably 0.01-8 parts by weight, more preferably 0.1-5 parts by weight per 100 parts by weight of the composition (R-3) or (R-4). When the amount is less than 0.001 part by weight, effect to improve compatibility is small and when it is more than 10 parts by weight, the effect reaches saturation and the dinitrodiamines remain as unsaturated materials in the polymer and emit offensive odor and besides, bring about deterioration of properties. Thus, good results cannot be obtained.

In order to more effectively produce thermoplastic resin compositions in the present invention, it is preferred to use a high kneading twin-screw extruder having a long L/D and is provided with two or more feed openings. Specifically, there are (1) a method of production by feeding the polyolefin-resin (A) and the polyphenylene-ether-resin (B) and, if necessary, the rubber-like materials (C), the modifiers and the radical initiators in fixed amounts from the first feed opening and the dinitrodiamines (D) and, if necessary, polyolefin and/or elastomeric polymers in fixed amounts from the second feed opening and melt kneading them or (2) a method of production by feeding the polyphenylene-ether-resin (B) and, if necessary, the rubber-like materials (C) in fixed amounts from the first feed opening and the polyolefin-resin (A) and, if necessary, the modifiers and the radical initiators in fixed amounts from the second feed opening, and the dinitrodiamines (D) and, if necessary, polyolefin and/or elastomeric polymers in fixed amounts from the third feed opening and melt kneading them.

The thermoplastic resin composition of the present invention can be easily molded into molded products by general molding methods such as injection molding, compression molding, blow molding, roll molding, laminate molding, vacuum molding, and air-pressure molding. The present invention further includes a method in which molded articles are obtained by dry-blending the components at the time of injection molding or extrusion molding and then directly kneading the components during melt processing operation, without the previous kneading.

Among these molding methods, injection molding is desired from the point of productivity. Pellets of the composition are previously dried by vacuum dryers or hot-air dryers and injection molded under given conditions such as injection speed, injection time, and cooling temperature to obtain molded products.

The molded products obtained from the thermoplastic resin compositions of the present invention can be applied to automobile parts and electrical and electronic parts. As examples of automobile parts, mention may be made of exterior parts such as bumper, fender, apron, hood panel, fascia, rocker panel, rocker panel reinforce, floor panel, rear quarter panel, door panel, door support, roof top, and trunk lid, interior parts such as instrument panel, console box, glove box, shift knob, pillar garnish, door trim, handle, arm rest, wind louver, carpet, heat rest, seat belt, and seat, parts of engine room such as distributor cap, air cleaner, radiator tank, battery case, radiator shroud, washer tank, cooling fan, and heater case, mirror body, wheel cover, trunk trim, trunk mat, and gasoline tank.

Among these automobile parts molding products, the thermoplastic resin composition of the present invention is suitably used for bumper and fender which require excellent stiffness and surface impact strength at low temperature.

BRIEF DESCRIPTION OF DRAWING

FIG. 1 shows an example of measured chart in evaluation of penetration impact strength in Example 1. Abscissa axis shows displacement amount (D:mm) which indicates deformation of test pieces and ordinate axis shows stress (N:Newton) corresponding to a certain displacement amount.

Yield point is the point at which stress corresponding to displacement amount changes from increase to decrease and breaking point is the point at which a material is broken and no longer shows change of stress.

Yield point energy is areal integral of displacement amount and stress from rising portion of detected stress to yield point of materials and total energy is areal integral of displacement amount and stress from rising portion to break point of materials.

EXAMPLES

The present invention will be explained by the following examples, it being understood that these examples are not intended to limit the present invention to them as far as they do not depart from the gist of the present invention.

Methods for measurement of properties in these examples are shown below.

(1) Melt flow rate:

This is measured according to JIS K6758. Measuring temperature is 260° C. andload is 2.16 unless otherwise notified.

(2) Tensile test:

This is measured according to ASTM D638. Thickness of test piece is 3.2 mm and tensile yield strength and tensile elongation are evaluated. Measuring temperature is 23° C. unless otherwise notified.

(3) Flexural test:

This is measured according to JIS K7203. Flexural modulus and flexural strength are evaluated under the conditions of thickness of test pieces: 3.2 mm, span length: 50 mm, and loading rate: 1.5 mm/min. Measuring temperature is 23° C. unless otherwise notified. In case of employing other temperatures, measurement is conducted after conditioning for 30 minutes in a constant-temperature bath of a given temperature.

(4) Izod impact strength:

This is measured according to JIS K7110. Thickness of test pieces is 3.2 mm and notched impact strength is evaluated. Measuring temperature is 23° C. unless otherwise notified. In case of employing other temperatures, measurement is conducted after conditioning for 2 hours in a constant-temperature bath of a given temperature.

(5) Penetration impact strength:

High Rate Impact Tester (RIT-8000) manufactured by Rheometrics Co. (U.S.A.) is used. A plate test piece of 3 mm thick is fixed by a circular holding fixture of 2 inches and an impact probe of 5/8 inch (point spherical surface 5/16 inch R) is struck on the test piece at a rate of 3 m/sec and displacement amount and stress are detected. Based thereon a curve as shown in FIG. 1 is drawn and areal integral value is calculated, whereby penetration impact strength is evaluated.

FIG. 1 is an example of measurement chart in evaluation of penetration impact strength in Example 2. Abscissa axis shows displacement amount which indicates deformation of test pieces and ordinate axis shows stress (N:Newton) corresponding to displacement amount. Both the values are continuously detected and are continuousfLy plotted in an X-Y plotter to obtain the measurement chart.

Areal integration of displacement amount and stress from rising portion of detected stress to yield point of materials is conducted. to obtain yield point energy and areal integration of displacement amount and stress from the rising portion to break point of the materials is conducted to obtain total energy.

For breaking state, whether it is ductile fracture (D) or brittle fracture (B) is judged by observing actual test pieces subjected to the destructive test.

Energy value required for yielding of materials is evaluated by yield point energy and energy value required for breaking of the materials is evaluated by total energy and are both expressed by joule (J).

Conditioning is carried out by a constant-temperature bath attached to the apparatus. A test piece is put in a constant-temperature bath previously adjusted to a given temperature and conditioning is carried out for 2 hours and then the above test is conducted. This temperature is measuring temperature.

(6) Heat distortion temperature:

This is measured by JIS K7207. Fiber stress is measured at 4.6 kg/cm.

(7) Mooney viscosity:

This is measured according to JIS K6300. Measuring temperature is 121° C.

(8) Ethylene content:

A pressed sheet is made from the composition and ethylene content is obtained by a calibration method using absorbance of characteristic absorption of methyl ($-CH_3$) and methylene ($-CH_2-$) which appear in infrared absorption spectrum measured on the pressed sheet.

(9) Intrinsic viscosity:

Reduced viscosities are measured at three points of concentrations of 0.1, 0.2, and 0.5 g/dl using Ubbelohde's viscometer. Intrinsic viscosity is obtained by the calculation method mentioned in "Polymer Solution, Polymer Experimental Study 11", (published from Kyoritsu Shuppan Co., 1982), page 491, namely, an extrapolation method which comprises plotting reduced viscosities for concent.ration and extrapolating concentration at 0.

Test pieces used for the above evaluation of properties were produced under the following injection molding conditions unless otherwise notified. Composition was dried at 120° C. for 2 hours by a hot-air dryer and then was injection molded at a molding temperature of 260° C. and a mold cooling temperature of 50° C. for an injection time of 15 seconds and a cooling time of 30 seconds by IS150 E-V type injection molding machine manufactured by Toshiba Machine Co., Ltd.

The following compositions were prepared under the following conditions unless otherwise notified. Respective components were weighed in given amounts, preliminarily uniformly mixed by a Henschel mixer and then molded by a continuous twin-screw kneading machine (TEX 44 SS 30BW-2V manufactured by Nippon Seikosho K. K.) at an extrusion amount of 30 kg/hour, a resin temperature of 260° C., and at a screw rotation rate of 350 rotations/min under suction from a vent. Regarding screws, rotors of triple thread type and kneading discs of triple thread type were arranged in two places respectively next to the first feed opening and the second feed opening in the kneading zone.

Reference Example 1 [Polyolefin-resin (A)]

Polypropylene was prepared by the slurry polymerization method mentioned in Japanese Patent Kokai No. 60-28405. Melt flow rate of polypropylene was measured at 230° C. under a load of 2.16 kg. The same applies to the following.

<PP-1>

Crystalline propylene homopolymer having a melt flow rate of 0.5 (g/10 min) and an intrinsic viscosity of 3.05 (dl/g) measured in tetralin solvent at 135° C. wherein content of a fraction soluble in cold xylene of 20° C. is 2.9% by weight, content of a boiling heptane soluble fraction is 6.7% by weight and isotactic pentad of a boiling heptaneinsoluble fraction is 0.952.

<PP-2>

Crystalline propylene/ethylene block copolymer having a melt flow rate of 7.5. (g/10 min) and an intrinsic viscosity of 2.18 (dl/g) measured in tetralin at 135° C. wherein proportion of a propylene homopolymer portion (hereinafter referred to as "portion P") which is the first segment polymerized at the first step is 84% by weight, proportion of an ethylene-propylene copolymer portion (hereinafter referred to as "portion EP") which is the second segment polymerized at the second step is 16% by weight, molecular structure of the portion P is such that intrinsic viscosity in tetralin solvent at 135° C. is 1.35 (dl/g), content of a fraction soluble in cold xylene of 20° C. is 2.6% by weight, content of a boiling heptane-soluble fraction is 7.0% by weight and isotactic pentad of a boiling heptane-insoluble fraction is 0.957 and molecular structure of the portion EP is such that intrinsic viscosity in tetralin at 135° C. is 4.8 (dl/g), and ratio of ethylene/propylene in a portion EP is 37/63 by weight.

<PP-3>

Highly crystalline polypropylene having an intrinsic viscosity of 2.42 (dl/g) in tetralin solvent at 135° C. and a melt flow rate of 1.6 (g/10 min) wherein content of a fraction soluble in cold xylene of 20° C. is 0.6% by weight, content of a boiling heptane soluble fraction is 2.9% by weight, and isotactic pentad of a boiling heptane-insoluble fraction is 0.980.

<PP-4>

Crystalline propylene homopolymer having an intrinsic viscosity of 1.30 (dl/g) in tetralin solvent at 135° C. and a melt flow rate of 36 (g/10 min) wherein content of a fraction soluble in cold xylene of 20° C. is 3.2% by weight, content of a boiling heptane-soluble fraction is 7.0% by weight, and isotactic pentad of a boiling heptane-insoluble fraction is 0.952.

<PP-5>

Crystalline propylene homopolymer having a melt flow rate of 1.3 (g/20 min) and an intrinsic viscosity of 2.45 (dl/g) in tetralin at 135° C. wherein content of a fraction soluble in cold xylene of 20° C. is 2.9% by weight, content of a boiling heptane-soluble fraction is 6.7% by weight, and isotactic pentad of a boiling heptane-insoluble fraction is 0.955.

Modified polypropylene was prepared by the following process.

<M-PP-1>

100 parts by weight of PP-5 and 1.0 part by weight of maleic anhydride, 0.6 part by weight of propylene homopolymer on which 8% by weight of 1,3-bis(t-butylperoxyisopropyl)benzene (SANPEROX® -TY1.3 manufactured by Sanken Kako Co.) was supported as a radical initiator, and 0.1 part by weight of a stabilizer IRGANOX® 1010 (manufactured by Ciba Geigy Co.) were uniformly mixed by a Henschel mixer and then melt kneaded by a twin-screw extruder TEX 44SS-30BW-2V manufactured by Nippon Seikosho K. K. at 220° C. and average residence time of 1.5 minute to produce maleic anhydride-modified polypropylene having addition amount of maleic anhydride of 0.08 by weight and a melt flow rate of 36 (g/10 min). Reference Example 2 [Polyphenylene-ether-resin (B)]

<PPE-1>

Poly-2,6-dimethylphenylene ether having an intrinsic viscosity of 0.30 (dl/g) measured in chloroform of 25° C. was used as polyphenylene-ether. Reference Example 3 [Rubber-like material (C)]

<EPR-1>

Ethylene-propylene copolymer rubber (ESPRENE® E 111P) having a Mooney viscosity at 121° C. of 33 and having an ethylene content of 73% by weight was used as a rubber-like material.

<SEP-1>

Partially hydrogenated styrene-isoprene block copolymer (KRATON® G1701 manufactured by Shell Chemical Co.) was used as styrene copolymer rubber.

Reference Example 4 [Dinitrodiamines (D)]

<DNA-1>

In a 1 liter four-necked flask equipped with a stirrer, a thermometer, and a condenser were charged 116.2 g (1.0 mol) of 1,6-diaminohexane, 178.2 g (2.0 mol) of 2-nitropropane, and 140 g of methanol and then, thereto was added dropwise 162.3 g (2.0 mol) of 37% formalin over a period of 1 hour at 45–55° C. with stirring. After addition of formalin, the content was kept at the same temperature for 1 hour and then separated into layers with addition of 200 ml of water.

The oil layer was washed with 200 ml of water and then concentrated under the conditions of 60° C. and 30 Torr to obtain 304 g of light yellow liquid. This liquid was analyzed by high performance liquid chromatography to find that it contained 298 g of N,N'-bis(2-methyl-2-nitropropyl)-1,6diaminohexane and 5 g of 2-nitropropane.

To this liquid were added 300 ml of n-hexane and 150 ml of toluene to carry out dissolution, followed by cooling to 5° C. to result in a slurry with precipitation of crystal. This mixture was filtered and the resulting crystal was washed with 100 ml of cold n-hexane and thereafter was vacuum dried at lower than 20° C. to obtain 288 g of N,N'-bis (2-methyl-2-nitropropyl) -1,6-diaminohexane.

This compound was light yellow crystal and had a melting point of 26°-27° C.

Elemental analysis values of this compound were as follows.

|  | C | H | N |
|---|---|---|---|
| Found | 52.69% | 9.45% | 17.57% |
| Calcd. | 52.81% | 9.50% | 17.60% |

Reference Example 5 [Masterbatch of dinitrodiamines (D)]

<DNA-1MB>

80 parts by weight of talc and 20 parts by weight of DNA-1 were uniformly mixed by Henschel mixer to prepare a powdery masterbatch.

Reference Example 6 [Masterbatch of radical initiator]

<PO-1MB>

A propylene homopolymer on which 8 parts by weight of 1,3-bis(t-butylperoxypropyl)benzene (SANPEROX®-TY1.3 manufactured by Sanken Kako Co.) as an organic peroxide as radical initiators was supported was used.

Examples and comparative examples were carried out by using the materials of Reference Examples 1-6 as starting materials. Compositions are shown in Tables 1 and 3 and properties of the corresponding compositions are shown in Tables 2 and 4. Regarding compositions shown in Table 1, the polyolefin-resin (A), the polyphenylene-ether-resin (B), and the rubber-like material (C) are shown by % by weight so that amounts of them total to 100% by weight. Amounts of the other components are shown by part by weight based on 100 parts by weight of the above total amount of polymers.

EXAMPLE 1

PP-1 (5.6 kg), PPE-1 (3.0 kg), El? R-1 (1.4 kg), maleic anhydride (0.15 kg), styrene (0.2 kg), and PO-1MB (0.12 kg) were uniformly mixed by a Henschel mixer. Then, the mixture was fed to a twin-screw kneading machine TEX 44 SS-30BW-2V manufactured by Nippon Seikosho K. K. set at 240° C. from the first feed opening and was melt kneaded. Then, DNA-1 (0.2 kg) was fed from the second feed opening in a constant amount using a micropump KHD-W-294 manufactured by Kyowa Seimitsu Co. and a thermoplastic resin composition was produced at an extrusion amount of 30 kg under suction from a vent. Feed composition ratio is shown in Table 1. From this composition, test pieces were prepared under given molding conditions and were subjected to evaluation of properties by given evaluation methods. Results of evaluation are shown in Table 2.

COMPARATIVE EXAMPLE 1

A composition was produced in the same manner as in Example 1 except that DNA-1 was not used. Test pieces were prepared therefrom under given molding conditions and subjected to evaluation of properties by given methods. The results are shown in Table 2. It can be seen that the thermoplastic resin composition of Example 1 of the present invention was remarkably improved in Izod impact strength and heat distortion temperature as compared with the composition of Comparative Example 1 where DNA-1 was not used as dinitrodiamines.

EXAMPLE 2

PP-1 (3.0 kg), PPE-1 (1.0 kg), EPR-1 (2.2 kg), SEP-1 (0.1 kg) , maleic anhydride (0.15 kg) , styrene (0.2 kg), and PO-1MB (0.12 kg) were uniformly mixed by a Henschel mixer and fed from the first feed opening and melt kneaded as in Example 1. Then, PP-2 (3.7 kg) and DNA-1MB (0.5 kg) were fed from the second feed opening in a constant amount and a thermoplastic resin composition was produced in the same manner as in Example 1. Feed composition ratio is shown in Table 1. Test pieces were prepared therefrom under given molding conditions and were subjected to evaluation of properties by given methods. The evaluation results are shown in Table 2.

COMPARATIVE EXAMPLE 2

Example 2 was repeated except that DNA-1MB was not used. Test pieces were prepared under given molding conditions and subjected to evaluation of properties by given methods. The results are shown in Tables 1 and 2.

It can be seen that the thermoplastic resin composition of Example 2 of the present invention was markedly improved in Izod impact strength and heat distortion temperature as compared with the composition of Comparative Example 2 where dinitrodiamine was not used.

EXAMPLE 3

A thermoplastic resin composition was obtained in the same manner as in Example 2 except that amount of PP-1 was 2.0 kg and that of PPE-1 was 2.0 kg. Test pieces were prepared therefrom under given molding conditions and were subjected to evaluation of properties by given methods. The results are shown in Tables 1 and 2.

COMPARATIVE EXAMPLE 3

A composition was produced in the same manner as in Example 3 except that DNA-1MB was not used. Test pieces were prepared therefrom under given molding conditions and subjected to evaluation of properties by given methods. The results are shown in Tables 1 and 2.

It can be seen that the thermoplastic resin composition of Example 3 of the present invention was much improved in Izod impact strength and heat distortion temperature as compared with the composition of Comparative Example 3 where dinitrodiamine was not used.

EXAMPLE 4

A thermoplastic resin composition was obtained in the same manner as in Example 3 except that amount of EPR-1 was 2.1 kg and that of SEP-1 was 0.2 kg. Test pieces were prepared therefrom under given molding Conditions and were subjected to evaluation of properties by given methods. The results are shown in Tables 1 and 2.

COMPARATIVE EXAMPLE 4

A composition was obtained in the same manner as in Example 4 except that DNA-1MB was not used. Test pieces were prepared under given molding conditions and subjected to evaluation of properties by given methods. The results are shown in Tables 1 and 2.

It can be seen that the thermoplastic resin composition of Example 4 of the present invention were uniformly mixed at the ratio as shown in Table 3 by a Henschel mixer and was fed from the first feed opening at a time and thermoplastic resin compositions of the present invention was produced under given conditions.

In Comparative Examples 5–7, compositions were produced in the same manner as in Examples 6–10 except that dinitrodiamine (D) was not used.

Test pieces were prepared under given molding conditions and evaluation of properties were conducted by given methods in Examples 6–10 and Comparative Examples 5–7. Results of evaluation of properties are shown in Table 4.

When comparison is made between Examples 6 and 7 and Comparative Example 5, Example 8 and Comparative Example 6, and Example 10 and Comparative Example 7, it can be seen that tensile characteristics of thermoplastic resin compositions of Examples of the present invention in which dinitrodiamine (D) was added was extremely superior.

EXAMPLE 11

First, a thermoplastic resin composition was produced from polyolefin-resin (A), polyphenylene-ether-resin (B), and dinitrodiamine (D) at the ratio shown in Table 3 in the same manner as in Examples 6–10 and then, this thermoplastic resin composition was uniformly mixed with polyolefin at the ratio shown in Table 3 by a Henschel mixer. The mixture was fed from the first feed opening at a time and a thermoplastic resin composition of the present invention was produced under given conditions. was markedly improved in Izod impact strength and heat distortion temperature as compared with the composition of Comparative Example 4 where dinitrodiamine was not used.

EXAMPLE 5

A thermoplastic resin composition was produced at the same composition as in Example 2 by changing the process for production.

PP-1 (3.0 kg), PPE-1 (1.0 kg), EPR-1 (2.2 kg), SEP-1 (0.1 kg), maleic anhydride (0.15 kg), styrene (0.2 kg), and PO-1MB (0.12 kg) were uniformly mixed by a Henschel mixer and the mixture was fed to the first feed opening and DNA-1MB (0.5 kg) was fed to the second feed opening in constant amounts and a thermoplastic resin composition was produced at a total extrusion amount of 30 kg/hour under suction from a vent. This thermoplastic resin composition (7.27 kg) and PP-2 (3.7 kg) were uniformly mixed by a Henschel mixer and the mixture was fed from the first feed opening at a time and the desired thermoplastic resin composition was produced under given conditions. Test pieces were prepared therefrom under given molding conditions and were subjected to evaluation of properties by given evaluation methods. The results are shown in Tables 1 and 2.

This thermoplastic resin composition had nearly the same good properties as that of Example 2.

EXAMPLES 6–10 AND COMPARATIVE EXAMPLES 5–7

In Examples 6–10, polyolefin-resin (A), polyphenylene-ether-resin (B), and dinitrodiamine (D)

Test pieces were prepared under given molding conditions and evaluation of properties was conducted by given evaluation methods. The results are shown in Table 4.

The thermoplastic resin composition of Example 11 of the present invention was much superior in tensile characteristics to the composition of Comparative Example 7 and besides was equal or superior in flowability as shown by melt flow rate.

TABLE 1

| No. | Polyolefin-resin (A) | Polyphenylene-ether-resin (B) (wt %) (R-2) | Rubber-like material (C) (R-4) | | Maleic anhydride (F) | Styrene (N) | Radical initiator (PO-1MB) (part by weight) part by weight based on 100 parts by weight of (R-2) | Dinitro-diamines (D) | Polyolefin part by weight based on 100 parts by weight of (R-2) |
|---|---|---|---|---|---|---|---|---|---|
| Example 1 | PP-1 56 | PPE-1 30 | EPR-1 14 | | 1.5 | 2.0 | 1.2 | DNA-1 1.9 | — |
| Example 2 | PP-1 47.6 | PPE-1 15.9 | EPR-1 34.9 | SEP-1 1.6 | 2.4 | 3.2 | 1.9 | DNA-1MB 7.9 | PP-2 63.1 |
| Example 3 | PP-1 | PPE-1 | EPR-1 | SEP-1 | 2.4 | 3.2 | 1.9 | DNA-1MB | PP-2 |

TABLE 1-continued

| | | | | | | | | | |
|---|---|---|---|---|---|---|---|---|---|
| Example 4 | PP-1 31.7 | PPE-1 31.7 | EPR-1 35.0 | SEP-1 1.6 | 2.4 | 3.2 | 1.9 | DNA-1MB 7.9 | PP-2 63.1 |
| Example 5 | PP-1 31.7 | PPE-1 31.7 | EPR-1 33.4 | SEP-1 3.1 | 2.4 | 3.2 | 1.9 | DNA-1MB 7.9 | PP-2 63.1 |
| Comparative Example 1 | PP-1 47.6 | PPE-1 15.9 | EPR-1 34.9 | SEP-1 1.6 | 1.5 | 2.0 | 1.2 | — | — |
| Comparative Example 2 | PP-1 56 | PPE-1 30 | EPR-1 14 | | 2.4 | 3.2 | 1.9 | — | PP-2 63.1 |
| Comparative Example 3 | PP-1 47.6 | PPE-1 15.9 | EPR-1 34.9 | SEP-1 1.6 | 2.4 | 3.2 | 1.9 | — | PP-2 63.1 |
| Comparative Example 4 | PP-1 31.4 | PPE-1 31.7 | EPR-1 33.4 | SEP-1 3.2 | 2.4 | 3.2 | 1.9 | — | PP-2 63.1 |

TABLE 2

| | Melt flow rate (g/10 min) | Tensile properties | | Flexural properties | | Izod impact strength | | Penetration impact stength (YE/ET) | Heat distortion temperature (° C.) |
|---|---|---|---|---|---|---|---|---|---|
| | | Yield strength (kg/cm$^2$) | Elongation at break (%) | Modulus (kg/cm$^2$) | Strength (kg/cm$^2$) | 23° C. (kg · cm/cm) | −30° C. | −30° C. (J: Joule) | |
| Example 1 | 0.8 | 214 | 30 | 13200 | 409 | 8.9 | 2.5 | 1.7/3.3 (B) | 158 |
| Example 2 | 2.3 | 174 | 460 | 9700 | 207 | 90 | 20.0 | 25/39 (D) | 103 |
| Example 3 | 2.0 | 177 | 135 | 9600 | 216 | 45.7 | 9.5 | 24/37 (D~B) | 118 |
| Example 4 | 1.2 | 168 | 130 | 8800 | 210 | 59 | 30.0 | 26/40 (D) | 108 |
| Example 5 | 2.2 | 170 | 500 | 9600 | 200 | 95 | 25.0 | 27/42 (D) | 100 |
| Comparative Example 1 | 6.3 | 214 | 8 | 11800 | 313 | 1.8 | 1.2 | 0.7/2.3 (B) | 126 |
| Comparative Example 2 | 15.0 | 175 | 90 | 8700 | 160 | 18.2 | 9.7 | 10/12 (B) | 95 |
| Comparative Example 3 | 12.5 | 180 | 36 | 8600 | 170 | 9.2 | 5.0 | 9/11 (B) | 100 |
| Comparative Example 4 | 7.5 | 160 | 40 | 7900 | 160 | 11.9 | 6.5 | 11/13 (B) | 96 |

Notes)
*1 faicial impact strength; YE: Yield point energy; TE: Total energy; (D) and (B): Fracture states; (D): Ductile fracture; (B): Brittle fracture.

TABLE 3

| | Component | | | |
|---|---|---|---|---|
| | Polyolefin-resin (A) | Polyphenylene-ether-resin (B) | Dinitro-Poly-olefin | diamines (D) |
| No. | ratio (wt %) | | | (parts by weight) |
| Example 6 | PP-3 50 | PPE-1 50 | — | DNA-1 2 |
| Example 7 | PP-3 50 | PPE-1 5 | — | DNA-1 5 |
| Example 8 | M-PP-1 50 | PPE-1 50 | — | DNA-1 2 |
| Example 9 | M-PP-1 70 | PPE-1 30 | — | DNA-1 2 |
| Example 10 | M-PP-1 30 | PPE-1 70 | — | DNA-1 2 |
| Example 11 | M-PP-1 40 | PPE-1 30 | PP-4 30 | DNA-1 2 |
| Comparative Example 5 | PP-3 50 | PPE-1 50 | — | — |
| Comparative Example 6 | M-PP-1 50 | PPE-1 50 | — | — |
| Comparative Example 7 | M-PP-1 30 | PPE-1 | — | — |

TABLE 4

| | Properties | | |
|---|---|---|---|
| | Melt flow rate (g/10 min) | Tensile properties | |
| No. | | Yield strength (kg/cm$^2$) | Elongation at break (%) |
| Example 6 | 3.3 | 460 | 24 |
| Example 7 | 4.5 | 460 | 24 |
| Example 8 | 11 | 340 | 15 |
| Example 9 | 16 | 320 | 18 |
| Example 10 | 4.3 | 360 | 12 |
| Example 11 | 55 | 350 | 13 |
| Comparative Example 5 | 4.0 | 440 | 19 |
| Comparative Example 6 | 26 | 200 | 9 |
| Comparative Example 7 | 50 | 180 | 12 |

Industrial Applicability

As explained above, according to the present invention, a thermoplastic resin composition can be provided which is excellent in compatibility between polyolefin and polyphenylene ether, in balance of mechanical properties such as impact strength and heat resistance, and in solvent resistance.

The novel thermoplastic resin composition provided by the present invention can be easily processed into shaped articles, film sheets, and the like by processing methods normally used for thermoplastic resin compositions such as injection molding and extrusion molding and can afford articles which are markedly excellent in balance of stiffness, heat resistance, impact resistance, scratchability, paintability, oil resistance, chemical resistance, and water resistance and superior in uniformity of appearance and smoothness. The articles are suitably employed for uses which require heat resistance and impact resistance, especially impact resistance at low temperatures of markedly high level.

We claim:

1. A thermoplastic resin composition, comprising:
100 parts by weight of (R-1); and
0.001–10 parts by weight of a dinitrodiamine (D) per 100 parts by weight of (A)+(B), wherein the dinitrodiamine (D) is represented by the formula (I):

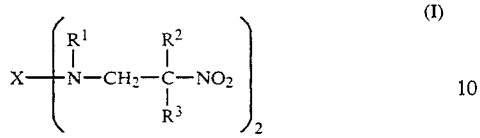

wherein X represents one of a divalent chain aliphatic group, a cyclic aliphatic group, an aromatic group, and an aromatic group containing one of a halogen or oxygen, $R^1$ represents one of a hydrogen atom, a chain aliphatic group, a cyclic aliphatic group or an aromatic group, with the proviso that when both the X and $R^1$ are chain aliphatic groups, nitrogen atoms may further bond to each other to form a heterocyclic ring through X and $R^1$, $R^2$ and $R^3$ are independently one of a hydrogen atom and an alkyl group of 1–12 carbon atoms, and $R^2$ and $R^3$ may bond to wherein (R-1) is obtained by melt-kneading a composition consisting essentially of:
95–5% by weight of a polyolefin-resin (A) based on the total weight of (A)+(B), said polyolefin-resin (A) is at least one member selected from the group consisting of polyolefins selected from homopolymers of one of ethylene and α-olefin and copolymers of two or more of ethylene and α-olefin, and modified polyolefins obtained by modifying said polyolefins with a modifier, wherein said modifier is at least one member selected from polyfunctional compounds (E) having at least one of a carboxylic acid group, an acid anhydride group, an acid amide group, an imide group, a carboxylic acid ester group, an epoxy group, an amino group and a hydroxyl group and unsaturated monomers (L) other than the polyfunctional compounds (E); and
5–95% by weight of a poly-phenylene-ether-resin (B) based on the total weight of (A)+(B), said poly-phenylene-ether-resin (B) is at least one member selected from the group consisting of polyphenylene ethers, modified polyphenylene ethers obtained by modifying said polyphenylene ethers with said modifiers, (E) and/or (L), compositions comprising a polyphenylene ether and at least one aromatic vinyl polymer resin (M) selected from the group consisting of an aromatic vinyl polymer, a copolymer of an aromatic vinyl compound with another monomer and a rubber-modified aromatic vinyl polymer and compositions comprising said modified polyphenylene ethers and at least one aromatic vinyl polymer resin (M); and
0.01–20 parts by weight of the polyfunctional compound (E) and/or the unsaturated monomer (L) per 100 parts by weight of (A)+(B), and optionally 0.001–10 parts by weight of a radical initiator per 100 parts by weight of (A)+(B).

2. A thermoplastic resin composition which comprises 100 parts by weight of the composition (R-1) defined in claim 1, 0.001–10 parts by weight of a dinitrodiamine (D) per 100 parts by weight of (A)+(B), and 1–1800 parts by weight of an additional polyolefin per 100 parts by weight of (A)+(B), and optionally 1–100 parts by weight of an elastomeric polymer per 100 parts by weight of (A)+(B), and wherein the amount of the additional polyolefin is less than 95% by weight based on the total amount of the additional polyolefin and the polyolefin-resin (A) of the composition (R-1).

3. A thermoplastic resin composition comprising:
(R-2) is obtained by melt-kneading:
100 parts by weight of (R-2) wherein
(R-2) is obtained by melt-kneading:
94–2% by weight of a polyolefin-resin (A) based on the total weight of (A)+(B)+(C), wherein said polyolefin-resin (A) is at least one member selected from the group consisting of polyolefins selected from homopolymers of one of ethylene and α-olefin and copolymers of two or more of ethylene and α-olefin, and modified polyolefins obtained by modifying said polyolefins with a modifier, wherein said modifier is at least one member selected from polyfunctional compounds (E) having at least one of a carboxylic acid group, an acid anhydride group, an acid amide group, an imide group, a carboxylic acid ester group, an epoxy group, an amino group and a hydroxyl group and unsaturated monomers (L) other than the polyfunctional compounds (E);
2–94% by weight of a polyphenylene-ether-resin (B) based on the total weight of (A)+(B)+(C), wherein said polyphenylene-ether-resin (B) is at least one member selected from the group consisting of polyphenylene ethers, modified polyphenylene ethers obtained by modifying said polyphenylene ethers with said modifiers (E) and/or (L), compositions comprising a polyphenylene ether and at least one aromatic vinyl polymer resin (M) selected from the group consisting of an aromatic vinyl polymer, a copolymer of an aromatic vinyl compound with another monomer and a rubber-modified aromatic vinyl polymer and compositions comprising said modified polyphenylene ethers and at least one aromatic vinyl polymer resin (M);
1–50% by weight of a rubber material (C) based on the total weight of (A)+(B)+(C), said material (C) is at least one material selected from the group consisting of natural or synthetic elastomeric polymers which are elastic at 20°–25° C. and modified elastomeric polymers obtained by modifying said elastomeric polymers with said modifier;
0.01–20 parts by weight of the polyfunctional compound (E) and/or the unsaturated monomer (L) per 100 parts by weight of (A)+(B)+(C), and optionally 0.001–10 parts by weight of a radical initiator per 100 parts by weight of (A)+(B)+(C); and
0.001–10 parts by weight of a dinitrodiamine (D) per 100 parts by weight of (A)+(B)+(C), said dinitrodiamine (D) being represented by the formula (I):

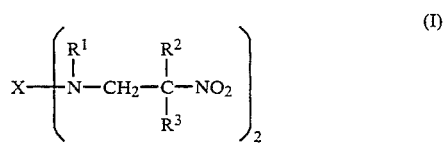

wherein X represents one of a divalent chain aliphatic group, a cyclic aliphatic group, an aromatic group, and an aromatic group containing one of a halogen or oxygen, $R^1$ represents one of a hydrogen atom, a chain aliphatic group, a cyclic aliphatic group or an aromatic group, with the proviso that when both the X and $R^1$ are chain aliphatic groups, nitrogen atoms may further bond to each other to form a heterocyclic ring through X and $R^1$, $R^2$ and $R_3$ are independently one of a hydrogen atom and an alkyl group of 1–12 carbon atoms, and $R^2$ and $R^3$ may bond to form a ring.

4. A thermoplastic resin composition which comprises 100 parts by weight of the composition (R-2) in claim 3, 0.001–10 parts by weight of a dinitrodiamine (D) per 100 parts by weight of (A)+(B)+(C) and 1–1800 parts by weight of an additional polyolefin per 100 parts by weight of (A)+(B)+(C), and optionally 1–100 parts by weight of an elastomeric polymer per 100 parts by weight of (A)+(B)+(C), wherein an amount of the additional polyolefin is less than 95% by weight based on the total amount of the additional polyolefin and the polyolefin-resin (A) of the composition (R-2) and an amount of the elastomeric polymer being less than 95% by weight based on the total amount of the elastomeric polymer and the rubber material (C) of the composition (R-2).

* * * * *